United States Patent
Discenzo

(10) Patent No.: US 8,036,847 B2
(45) Date of Patent: Oct. 11, 2011

(54) MAXIMUM INFORMATION CAPTURE FROM ENERGY CONSTRAINED SENSOR NODES

(75) Inventor: Frederick M Discenzo, Brecksville, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 258 days.

(21) Appl. No.: 12/237,422

(22) Filed: Sep. 25, 2008

(65) Prior Publication Data

US 2010/0076714 A1 Mar. 25, 2010

(51) Int. Cl.
*G01R 35/00* (2006.01)
(52) U.S. Cl. .................................................. 702/107
(58) Field of Classification Search .................. 702/107, 702/51; 73/862.324, 862.621; 324/220; 700/286; 381/71.12; 600/424
See application file for complete search history.

(56) References Cited

U.S. PATENT DOCUMENTS

| | | | | |
|---|---|---|---|---|
| 5,544,074 A | * | 8/1996 | Suzuki et al. | 702/51 |
| 5,629,986 A | * | 5/1997 | Shoureshi | 381/71.12 |
| 6,948,381 B1 | * | 9/2005 | Discenzo | 73/862.324 |
| 7,698,962 B2 | * | 4/2010 | LeFebvre et al. | 73/862.621 |
| 2007/0222436 A1 | * | 9/2007 | Gao et al. | 324/220 |
| 2007/0270686 A1 | * | 11/2007 | Ritter et al. | 600/424 |

* cited by examiner

*Primary Examiner* — Drew A Dunn
*Assistant Examiner* — Xiuquin Sun
(74) *Attorney, Agent, or Firm* — Turocy & Watson LLP; William R. Walburn; John M. Miller

(57) ABSTRACT

Adaptable self-powered sensor node and methods of operation providing real-time monitoring and management of node operation. The adaptable self-powered sensor node incorporates an adaptable generator and a radio transmitter to operate remotely without the need for power or communication wiring. Data analysis capabilities provide for maximizing information extracted from sensors and analysis and providing control or reporting information utilizing a strategy to minimize energy usage while reducing information entropy.

23 Claims, 32 Drawing Sheets

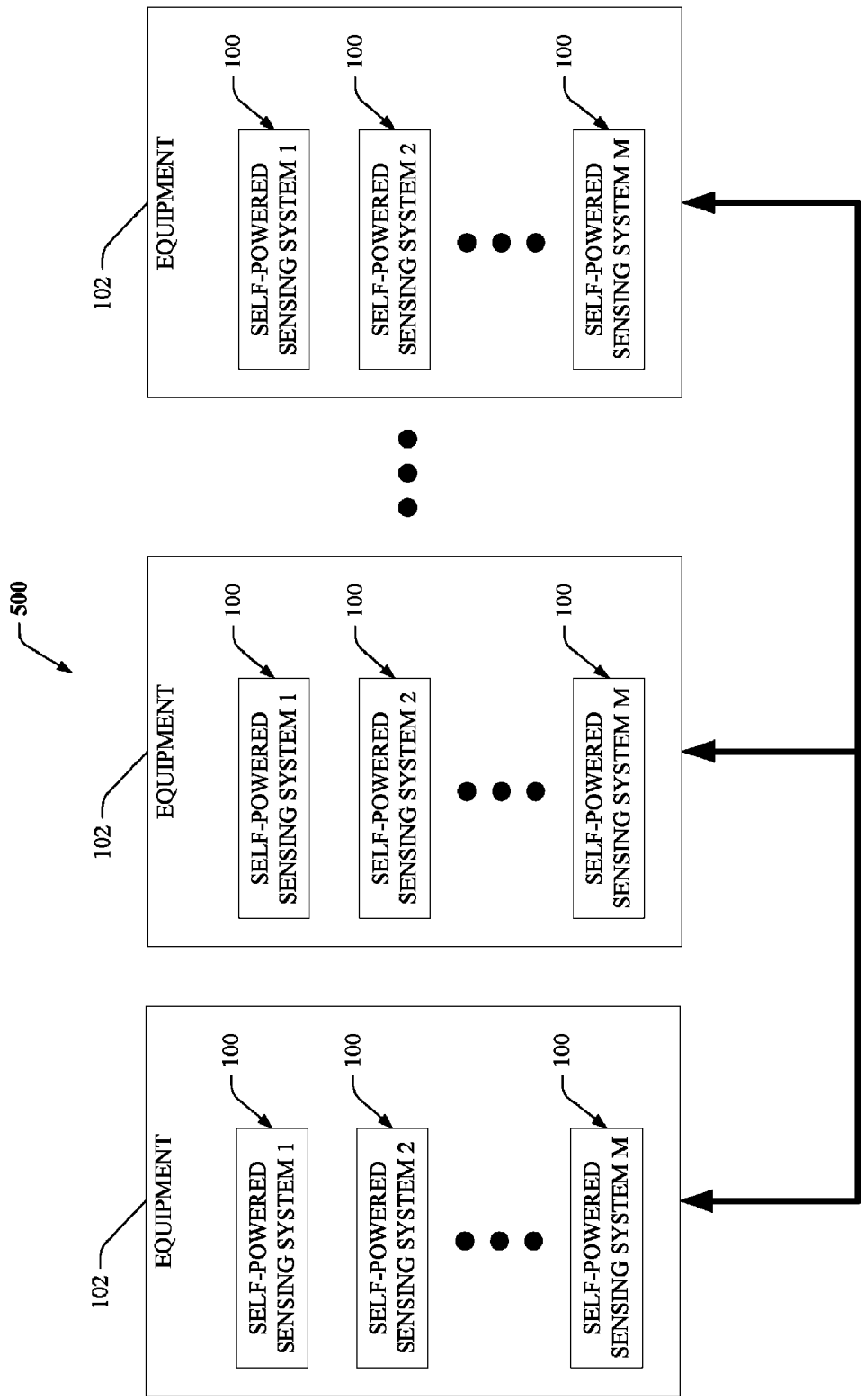

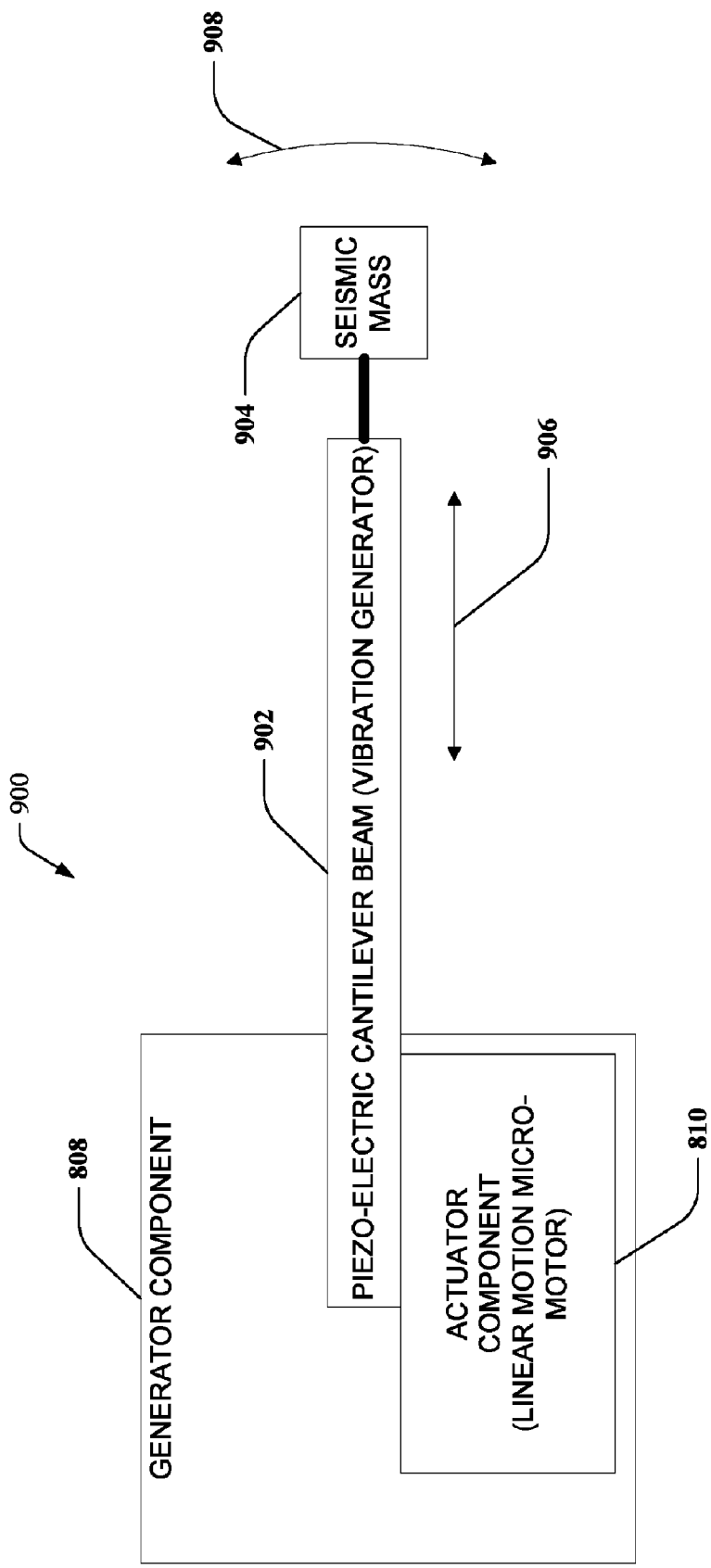

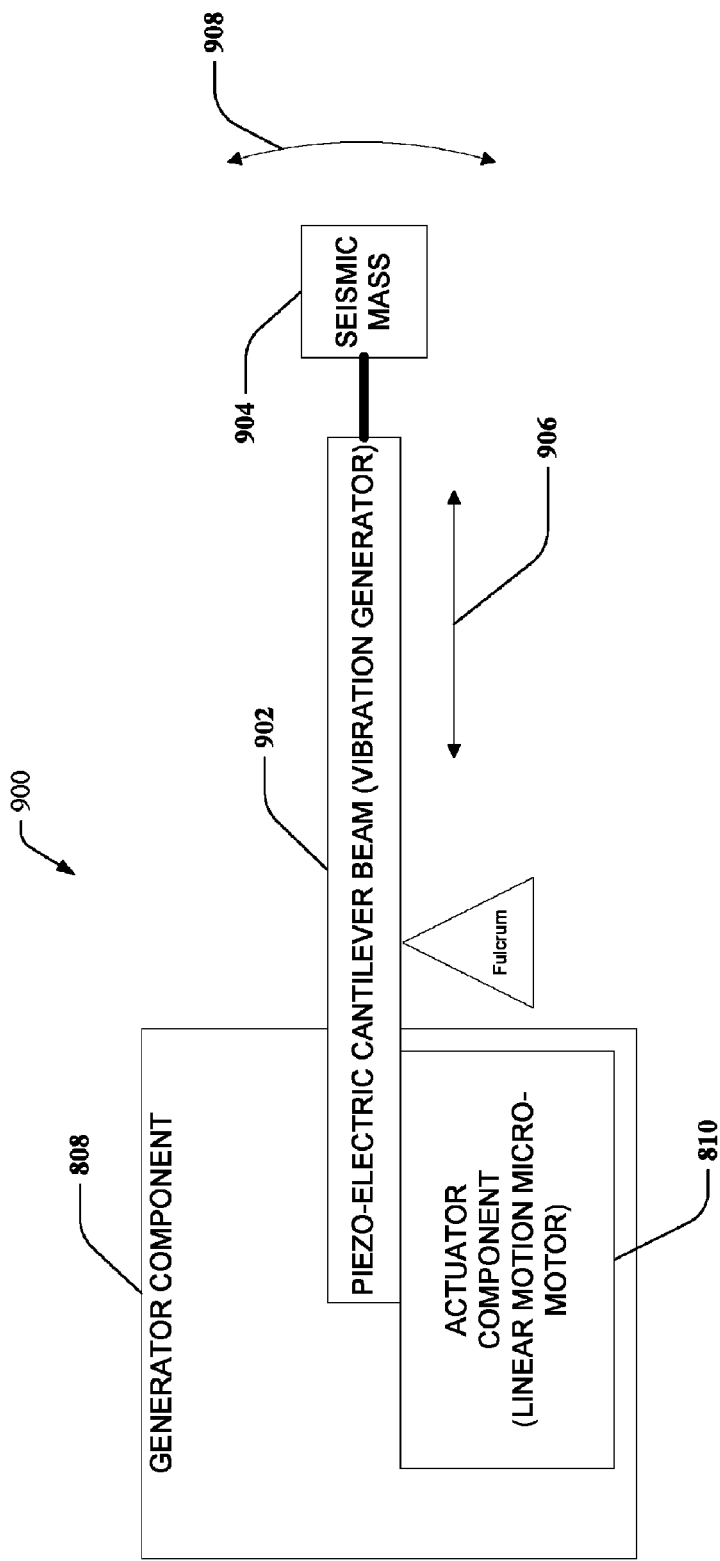

MAXIMUM INFORMATION CAPTURE FROM ENERGY CONSTRAINED SENSOR NODES

BACKGROUND

Industrial equipment requires constant maintenance to remain in peak operating condition. Traditionally, as equipment failed it was repaired or replaced based on the most economically appropriate course of action. Preventative maintenance was limited to lubricating moving components and replacing components based on a timed schedule. The practice of timed component replacement was subject to replacing components not yet in need of replacement or waiting too long and incurring the catastrophic failure of the component, possibly incurring greater production downtime, increased risk of personnel injury, increased consequential damage and loss, along with added replacement costs.

The development of sensor technology such as vibration measurement sensors allowed for the implementation of systems to more accurately predict a component failure based on an increase in vibration of the equipment over time or a characteristic change in the vibration frequency spectrum. Although this technology reduced the cost of maintenance and downtime, it introduced other problems associated with installing instrumentation on equipment in remote locations. It proved expensive and sometimes difficult to provide power to the instrumentation. Additionally, wiring for data communication with the instruments was costly and in many instances impractical because of the physical location, machinery movement, or hazardous environment associated with the operation of the equipment.

A solution to the problems associated with the data wiring was found with the advent of wireless networks. This technology allowed transmission of the collected data from the equipment to a location in the local area more conducive to power and data wiring. This solution however did not solve the problem of providing power to operate the sensor, processor and transmitter for the sensing device. Partially addressing this problem was the evolution of battery technology with greater storage capacity. This development allowed sensors to operate on battery power and eliminate the requirement of running power cables to the sensor location.

As before, the new solution once again introduces new problems of operation. The batteries require exchange on a frequency based on the power consumption and at the end of their useful life required appropriate disposal. Replacing batteries in hard to reach or dangerous locations, near operating equipment, or in hazardous environments often presents unacceptable risks for individuals and for companies. Furthermore, the discharge characteristics of batteries make it difficult to determine the amount of charge remaining in the battery. Batteries with unused power are typically discarded and replaced with new batteries. The cost, logistics, and disposal of batteries have an important economic and environmental impact. All of these activities equate to costs in many cases making the implementation prohibitively expensive.

The above scenario for powering remote sensors for machinery condition monitoring can be extended to the case for operating remote sensors, processors, actuators, data storage, wireless communications, and logic to provide not only enhanced machinery monitoring and protection, but also for surveillance, mobile systems monitoring, and remote control. This model is applicable to a single remote sensor node and also to multiple sensor-processor nodes operating to monitor components or systems and to exchange information and collaborate among the remote sensor-processor nodes. The processing logic on a sensor-processor node could be of a category referred to as agents or intelligent agents. An agent is a software model that is an abstraction of real-world entities and often is operated with some local autonomy and communication capability to achieve local goals or objectives in concert with support overarching system objectives. A sensor-processor node may provide a platform for deploying multi-agent systems (MAS) where each sensor-processor node could correspond to one or more logical agents.

The recognition of the value of remote sensing technology and distributed processing to provide predictive information for equipment maintenance along with the high cost and inconvenience of either running power lines or providing a battery update regimen has created market pressure to design a system providing the benefits of self-powered wireless sensors without the added cost associated with powering the sensing device. Similarly, the need to deploy remote monitoring and control modules and the desire for distributed intelligent agents each without access to local, wired line power provides even greater need for remote, efficiently self-powered sensor-processor devices.

SUMMARY

The following presents a simplified summary in order to provide a basic understanding of some aspects of the disclosed innovation. This summary is not an extensive overview, and it is not intended to identify key or critical elements or to delineate the scope of the invention. Its sole purpose is to present some concepts in a simplified form as a prelude to the more detailed description presented later.

The subject invention provides for a self-powered sensor node deriving its power from the vibrating equipment to which it is rigidly attached and a method of adjusting or tuning a electric power generator such as a piezo-electric cantilever beam to optimize power generation while analyzing information provided by the sensor to determine the condition of the vibrating machinery, define appropriate maintenance action, required times for servicing the equipment and predicting equipment failure. In another aspect, the self-powered sensor node includes a radio transmitter for delivering information concerning the status of the equipment to a data collection server.

The self-powered sensor node balances a schedule of collecting information from the vibration sensor against available power resources to adjust priorities between expending the available power to transmit information to the data collection server concerning the status of the equipment, conducting further data analysis on the previously sampled vibration data to extract more information or more accurate information concerning the status of the equipment, operating the vibration sensor to capture additional data, and tuning the piezo-electric generator to optimize power generation. In another aspect, the self-powered sensor node adjusts the length of the cantilever seismic mass so the cantilever beam's resonant frequency matches the vibration frequency containing the most energy of the vibrating equipment and therefore optimizes the power generating capabilities of the piezo-electric generator.

An embedded processor or microcontroller, another aspect of the invention, analyzes the vibration data against a state table of failure conditions for the equipment and predicts possible failures before they occur. The processor alternates times of data collection and analysis with sleep cycles to maximize the amount of information provided concerning the status of the equipment versus the energy expended to collect, analyze and report the information.

In yet another aspect of the invention, the embedded processor or microcontroller utilizes an optimization method that gathers relevant sensor data and processes the sampled data to determine the future condition of the monitored machinery and/or the environment. Estimates of future condition of the machinery provide valuable information to permit preventive maintenance and operational changes to avoid unexpected machinery failure. Estimates of the future condition of the machinery and/or the environment permits optimizing the expenditure of energy to dynamically change the resonant frequency of the cantilever beam to optimize power generation in the future.

The subject invention addresses the need created by market pressure for increasing the efficiency of operation of industrial, commercial and military equipment by reducing downtime and costs associated with performing too much maintenance or incurring additional damage, process upsets, and prolonged outage of equipment due to machinery failure because of too little maintenance. After installation, savings are realized in operating costs because of the lower capital investment by not requiring power and data communication wiring, not requiring battery replacement and disposal and reducing the cost of scheduled maintenance procedures and equipment downtime.

The above techniques for optimizing information capture, data analysis, prediction, and power generation are applicable to other application domains other than machinery condition monitoring. For example, a sensor node could include an embedded actuator, multiple energy scavenging technologies and be deployed for personnel monitoring or for surveillance applications.

In addition to the use of a piezoelectric cantilever beam to generate power, one or more other power generation methods may be deployed instead of or in addition to a piezoelectric generator. For example, a planar array of photovoltaic cells could be used to generate electricity by converting light energy to electricity. The generated power could be monitored, stored, and used just as power generated from a piezoelectric generator. In addition, power may be expended to operate alignment motors that orients the array of photovoltaic cells so they are aligned more perpendicular to the light rays coming from the light source. Energy must be judiciously expended to operate alignment motors however the benefit is a potentially much larger amount of energy may be generated per unit of time.

The above methods to optimize information capture subject to time and energy constraints may be employed with distributed nodes capable of local processing and collaboration with other nodes such as implemented as intelligent agents. For example intelligent agent activity directed as determining the condition of a valve could utilize an entropy measure of information to determine if it is appropriate to process information further, to share information with other nodes (agents), to request information from other nodes (agents), to provide actuation or control, or to operated local sensors to capture additional information.

Lastly, a distributed control system operating under conditions of limited time, energy constraints, and performance requirements, may employ an information theory approach to determine if time and energy should be expended to retune a feedback controller, to alter or more precisely adjust an adaptive model (such as used for model-reference control), or to analyze historical input-output relationships to establish the dynamic character of the process for future optimal control opportunities.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 5a depicts a block diagram of multiple self-powered sensor systems imbedded for collaborative operation in the equipment being monitored and communicatively coupled to similar configurations in other equipment being monitored.

FIG. 9 depicts a block diagram of a piezo-electric generator including the cantilevered arm and the adjustable seismic mass controlled by the linear motion micro-motor actuator.

FIG. 9a depicts a block diagram of a piezo-electric generator including the cantilevered arm and the adjustable seismic mass controlled by the linear motion micro-motor actuator and an adjustable fulcrum.

DETAILED DESCRIPTION

Figure 1:
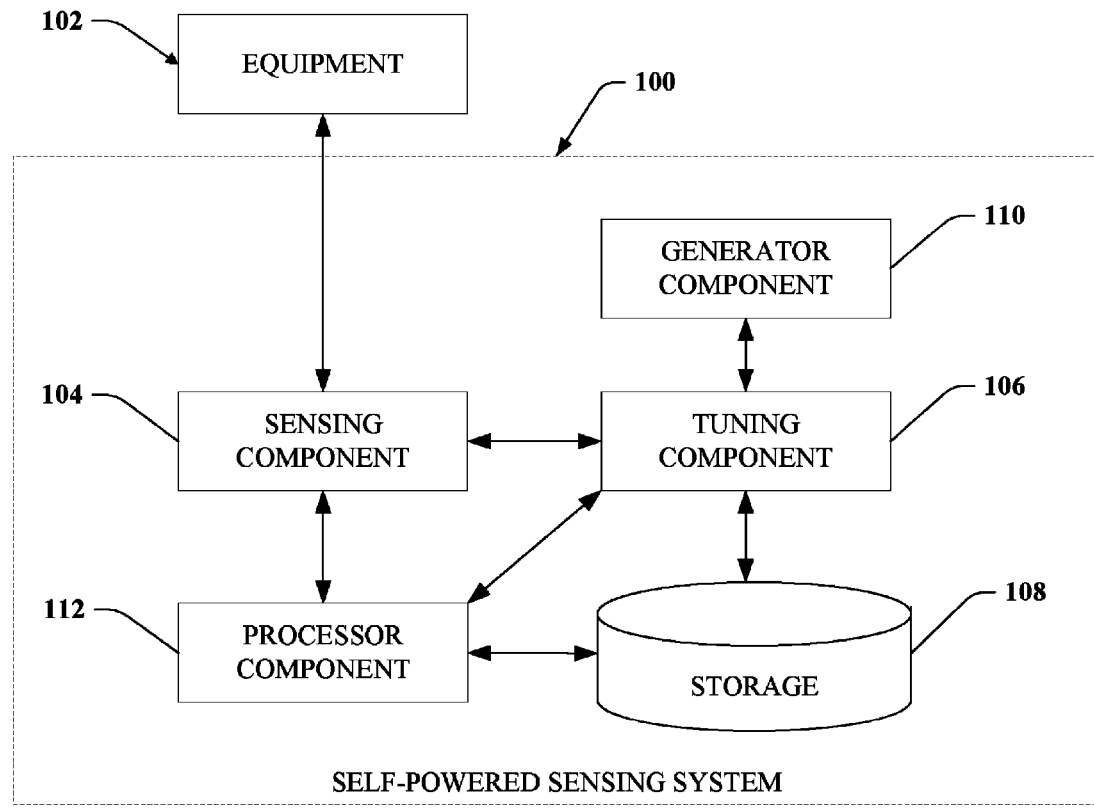
FIG. 1 depicts a block diagram representing a self-powered sensing system.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component," "system," "device", "equipment," "interface", "module", "node", "network," and/or the like are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer, an industrial controller, a relay, a sensor and/or a variable frequency drive. By way of illustration, both an application running on a server and the server can be a component. One or more components can reside within a process and/or thread of execution, and a component can be localized on one computer and/or distributed between two or more computers. Additionally, the term tuning and retuning are intended to refer to optimizing the available power and its use by adjusting the output of the generating device, adjusting process parameters, sharing power between sensor systems 100 and combining power generation from different sources based on minimizing the calculated entropy value of the system.

In addition to the foregoing, it should be appreciated that the claimed subject matter can be implemented as a method, apparatus, or article of manufacture using typical programming and/or engineering techniques to produce software, firmware, hardware, or any suitable combination thereof to control a computing device, such as a variable frequency drive and controller, to implement the disclosed subject matter. The term "article of manufacture" as used herein is intended to encompass a computer program accessible from any suitable computer-readable device, media, or a carrier generated by such media/device. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave generated by a transmitter can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, the terms to "infer" or "inference", as used herein, refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring to the drawings, FIG. 1 depicts a self-powered sensing system 100 and the associated vibrating equipment. The self-powered sensing system 100 converts the vibrations generated by equipment 102 into usable power to operate the self-powered sensing system 100. The self-powered sensing system 100 is rigidly attached to the equipment 102. As will be fully described later, the self-powered sensing system 100 can be attached to the external surface of the equipment 102 or embedded inside the equipment 102 as an integral part of the equipment 102. The vibrating equipment 102 can include a broad class of machines that posses the ability to move or vibrate while in operation. For example, vibrating equipment 102 can include motors, pumps, fans, compressors, vehicles, including trucks, cars and cranes, appliances, cables, civil structures, components mounted on vehicles, aircraft, spacecraft, ships, humans and animals. It should also be noted that a self-powered sensing system can include but is not limited to a self-powered controller, a self-powered actuator, a self-powered alarm or a self-powered display device.

Alternatively it may be placed in close proximity to the equipment 102 such as on a mounting structure for equipment 102, a support beam, or adjacent location that is mechanically coupled to equipment 102 such that vibrations from equipment 102 are mechanically transmitted through the structure to the self-powered sensing system 100. Regardless of whether the self-powered sensing system 100 is attached internally or externally or in close proximity to the equipment 102, the attachment must be in a rigid mounting fashion to ensure that the displacement and frequency of equipment movement from vibration transferred from the equipment 102 to the self-powered sensing system 100 is relatively unchanged or maximized such as through a tuned structure because the vibration transferred from the equipment 102 to the self-powered sensing system 100 is the fuel for the self-powered sensing system 100.

In one aspect of a self-powered sensing system 100, a sensing component 104 can detect vibrations from the equipment 102 based on the previously described attachment and analyze the vibration data to determine the content of the information to transmit to other devices. As will be fully described later, other devices can include servers 1420 and other self-powered sensing systems 100. The vibration data provided by the sensing component 104 is also analyzed to determine if the self-powered sensing system 100 is operating at peak efficiency with respect to power generation. The energy used by the sensing component 104 can be minimized by the processor component 112 implementing logic to turn off the sensing component 104 at times other than when sampling data.

Alternatively, a moveable array of photovoltaic cells can be added to replace or supplement the vibration generator. For example, a piece of equipment installed outside may not generate enough power based on vibration and the photovoltaic cells can be added to provide the required amount of power. The photovoltaic cells can include light measuring and tracking devices so the photovoltaic cells always produce the maximum amount of energy. Energy may optionally be expended to reorient the angle of the array of photovoltaic cells to increase the power generating efficiency but at the expense of expending energy to operate servomotors or other alignment machinery.

Alternatively, a processing element 112 can check the voltage being generated from the generator component 110 and the vibration characteristics from the sensing component 104 to determine if the self-powered sensing system 100 is operating at peak efficiency or at an adequate level of efficiency. It will often not be prudent to optimize the operation of the generator component 110 since the power expended to precisely and adaptively tune the generator may consume much more energy than the incremental energy generated from a good, suboptimal operation.

In another aspect of a self-powered sensing system 100, a tuning component 106, upon command from the processor component 112, can adjust the vibration characteristics of a power generator to match the vibration characteristics of the equipment 102. This analysis may be performed on a cyclical schedule based on both past vibration data and a prediction of future vibration characteristics of the equipment 100. Alternatively, analysis may be performed on an exception basis such as when an event occurs or when locally stored energy falls below a threshold level for example. A more detailed description of the vibration data analysis and the tuning logic is presented later in the specification. It should be noted that the tuning component 106 can recognize that further tuning of the generator with respect to current circumstances is inappropriate because of the physical characteristics of the generating system. For example, no greater power output is available from the generator component 110 because the cantilever beam is hitting the displacement stops, therefore no further energy should be expended in attempting to tune the system. This information can prove valuable in other contexts however, this situation can initiate an alarm condition for excessive vibration characteristics. It should also be noted that node operation is an optimization of the node with respect to the manufacturing process and other environmental factors surrounding the sensor node and the manufacturing process. Accordingly, the optimum configuration is a moving target requiring continuous update in a fashion similar to a control loop while always considering the power implications of continuous versus periodic or on-condition updates.

Another aspect of the self-powered sensing system 100 includes a processing component 112 that analyzes sampled sensor data obtained from sensing component 104. The analyzed data can be used to establish the condition of equipment 102 and/or to determine a suitable change in tuning component 106 that will provide for greater levels of energy to be scavenged from the vibration of equipment 102. It should be noted that generator types other than vibration generators can be tuned by the tuning component 106. For example, generator types such as capacitance, photovoltaic, fuel cell, coil-magnet, etc., even line or battery powered systems can benefit from using the subject invention algorithms and their entropy reducing calculations and adjustments to reduce the energy consumption of the sensor node. Algorithms for analyzing data, predicting future energy requirements and potential energy to be generated, and for calculating the gain in system information and reduction in system entropy are computed in processing element 112. Alternatively, algorithms may operate in another self powered sensing system 100 and the results of processing transmitted back to this device for processor component 112 to take appropriate action. System processing logic is presented in more detail later in this specification. In another aspect, the processing component 112 can provide the ability to self-diagnose all the components of the self-powered sensing systems 100. This self-diagnosis includes such tasks as automatically calibrating the sensing component 104, determining the proper operation of the processor component 112 and its associated memory, the generator component 110 with regards to it meeting its theoretical output based on the current circumstances. The results of the self-diagnosis can be shared with other self-powered sensing systems 100 or supervisory controllers.

Another aspect of the self-powered sensing system 100 includes a storage component 108. The storage component 108 provides persistent storage for operating software, configuration software, analyzing software, information extraction software, entropy estimation algorithms, communication software and data storage. The storage component 108 can include any of the computer storage media described subsequently for the adaptive self-powered sensor node processor 1300. The storage component 108 can also provide storage for preconfigured models for the self-powered sensor node 100. The models can be based on machine type such as compressor, pump or the like or can be predictive models based on predicted energy generation for example. In another aspect, the models can be adaptive based on a feedback control algorithm. The models can be generated on the self-powered sensor node 100 they run on or they can be communicatively delivered from other self-powered sensor nodes 100 where they were created. The self-powered sensor node 100 can also decide to change from one model to another based on current operating conditions and can supply the models to other self-powered sensor nodes 100 operating under similar circumstances.

Figure 1A:
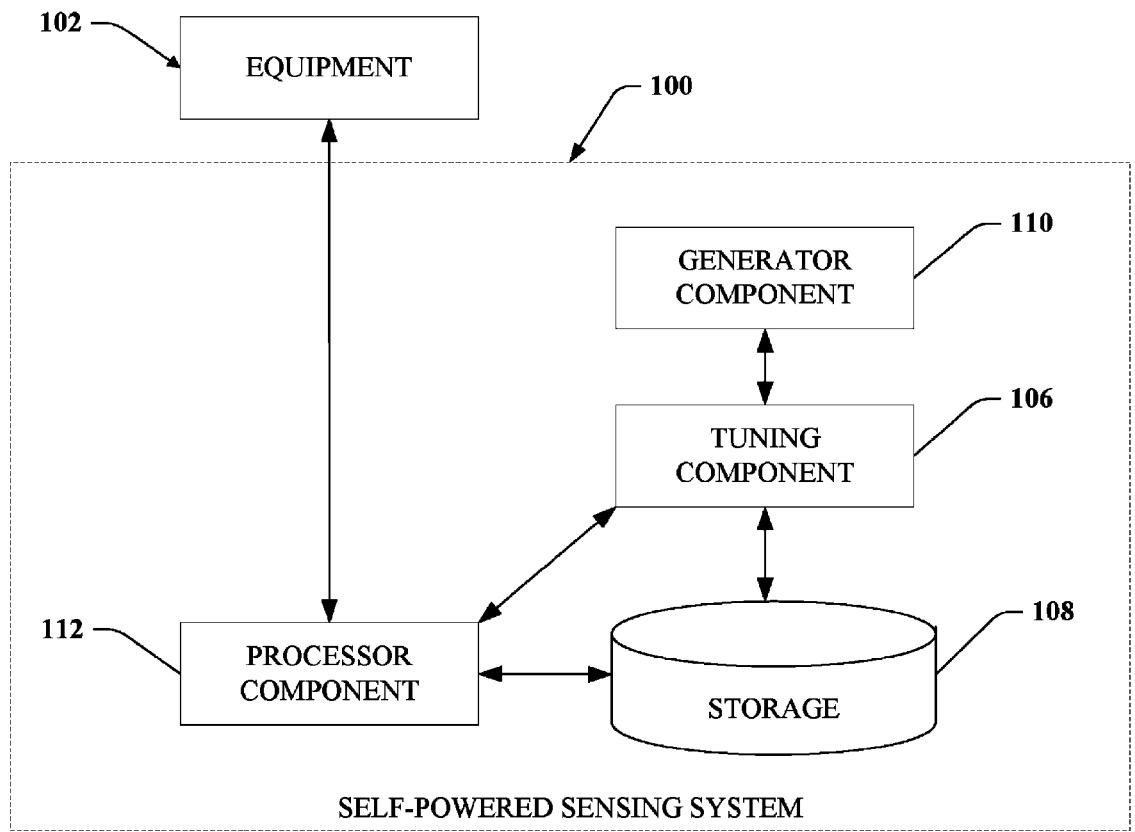
FIG. 1a depicts a block diagram representing a self-powered sensing system operating without the sensing component.
Figure 1B:
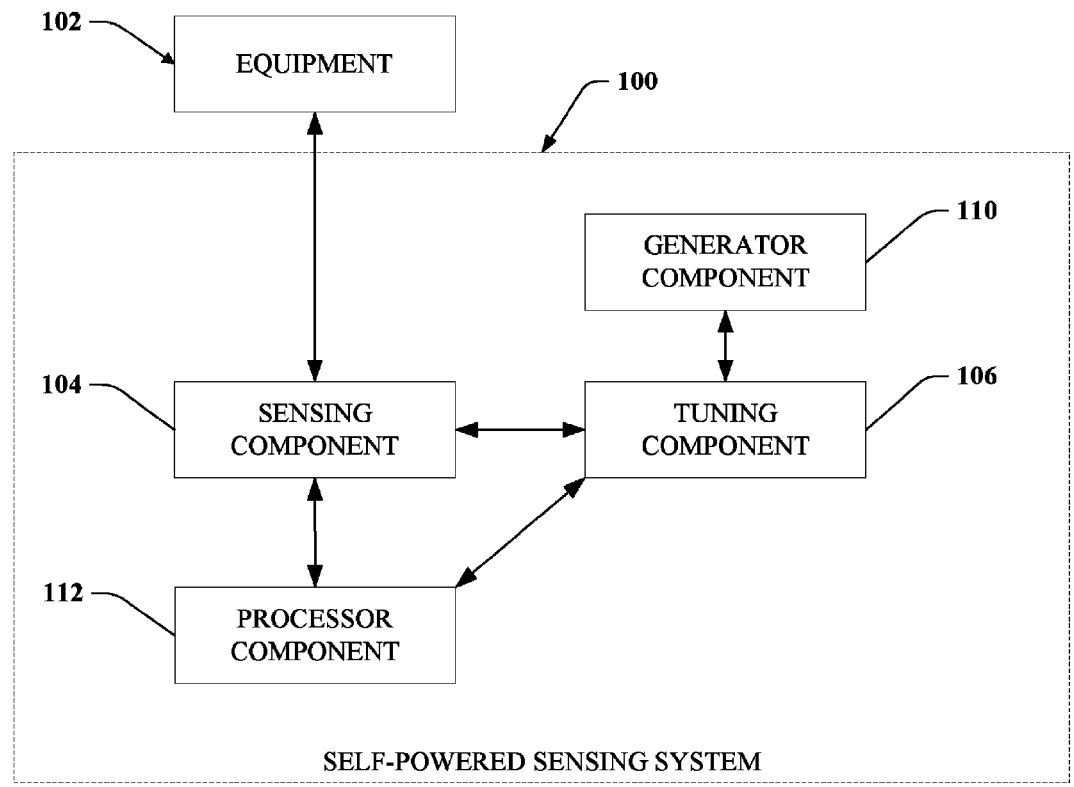
FIG. 1b depicts a block diagram representing a self-powered sensing system operating without the storage component.
Figure 1C:
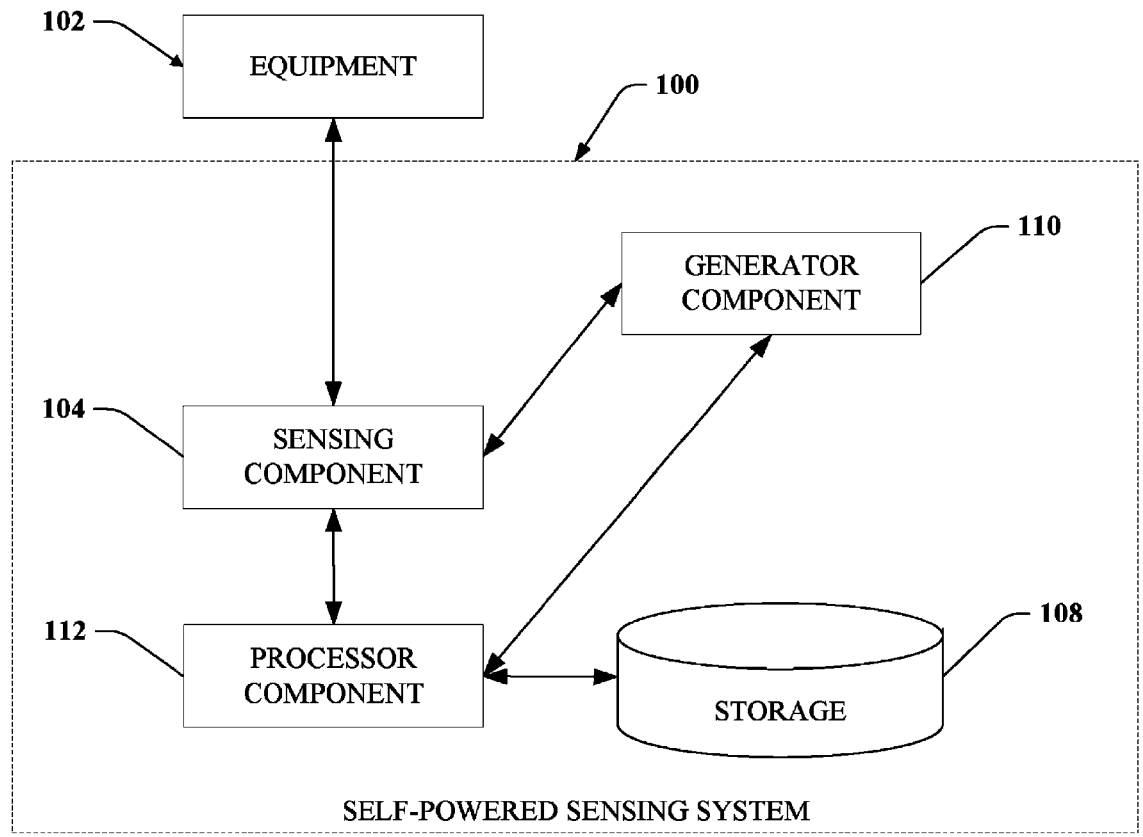
FIG. 1c depicts a block diagram representing a self-powered sensing system operating without the tuning component.

As illustrated in FIGS. 1a, 1b and 1c, one or more of the self-powered sensing system 100 components can be excluded or connected remotely from the self-powered sensing system 100. For example, the generator component 110 can be mounted in a position and orientation to maximize power generation while the processor component 112 and storage component 108 are mounted in a location free from vibration effects and remotely connected to the generator. As another example, the storage component may be eliminated and short term data is stored in the processor's main memory or the data may be processed as received and results can be "streamed" through the communications port (not shown) or displayed locally (not shown). In another example, the sensing component 104 can be excluded as illustrated in FIG. 1a because the characteristics of the generated power provides enough information to establish the condition of the monitored machine.

Figure 1D:
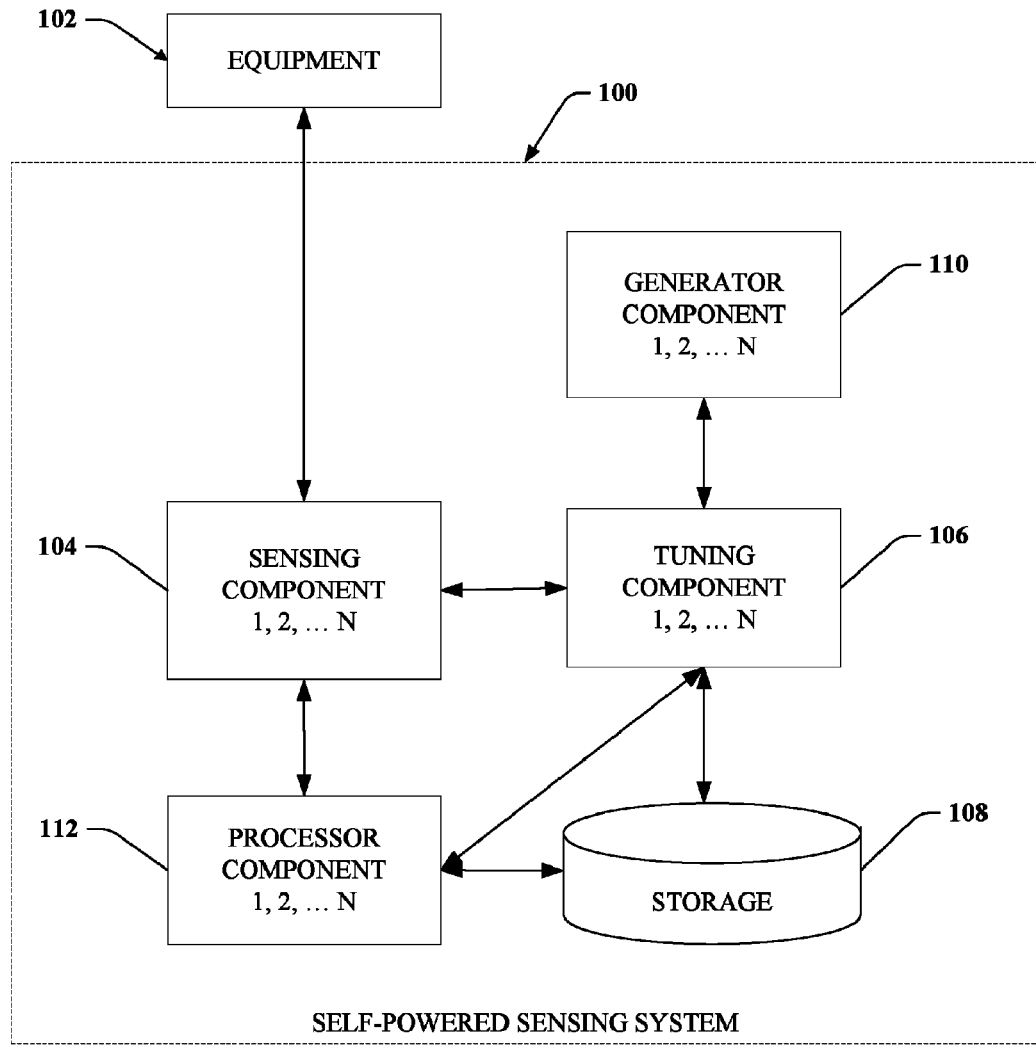
FIG. 1d depicts a block diagram representing a self-powered sensing system operating with multiple sensing components, processor components, tuning components and generator components.

Turning now to FIG. 1d, multiple components can be included in a single self-powered sensing system 100. For example, multiple sensing components 104 can be included to collect different information for comparison or analysis. The multiple sensing components 104 can include oil sensing, acoustic sensing, infrared sensing, ultraviolet sensing, etc.

Figure 2:
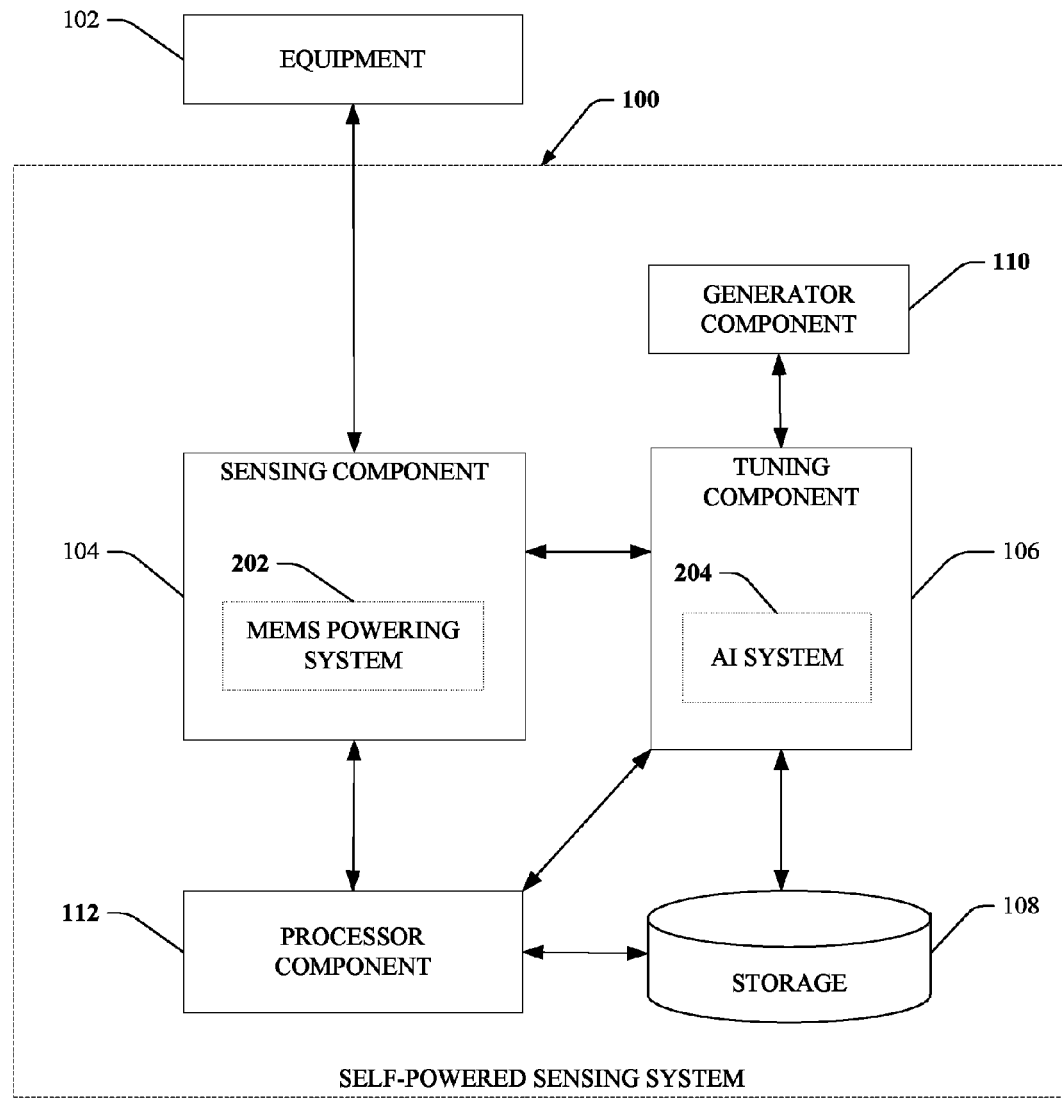
FIG. 2 depicts a block diagram representing a self-powered sensing system including a MEMS powering system of the Sensing Component and an AI System of the Tuning Component.

Returning to the drawings, FIG. 2 again depicts a self-powered sensor system 100 including another aspect of a Micro-Electro-Mechanical System (MEMS) powering system 202 as part of the sensing component and an AI system 204 as part of the tuning component.

In one aspect of a sensing component 104, the MEMS powering system 202 provides the electronics necessary to convert electrical signals from a format delivered by the sensing component 104 to a format compatible with the tuning component 106. The MEMS powering system 202 electronics also provide the ability to convert the power from the format generated by the machine vibrations to a format compatible with the energy storage component 814, described later in the specification. The MEMS powering system 202 can also manage the charging system including determining the state of the charge of energy storage component 814. In another aspect of the MEMS powering system 202, any required analog to digital or digital to analog conversions are provided. It should be noted that powering systems and electronics other than MEMS can be used in the sensing component.

In one aspect of a tuning component 106 an artificial intelligence system 204 can be used to analyze and calculate tuning schedules and parameters. Any inference as described herein can be done by fully or partially utilizing an artificial intelligence (AI) layer or component. The AI layer or component can be employed to facilitate inferring and/or determining when, where or how to collect vibration data from the sensing component 104 and using this data, determine when and under what circumstances to tune the power generating system. Such inference results in the construction of new events or actions from a set of observed events and/or stored event data, whether or not the events are correlated in close temporal proximity, and whether the events and data come from one or several event(s) and data source(s).

The AI component can include an analytic model of the environment and equipment 102 that permits estimating future characteristics of vibration with suitable accuracy to permit optimizing the tuning component 106 to maximize the amount of energy generated and/or to maximize the amount of information extracted from the sensed vibration. Other models such as statistical, qualitative, causal, or pattern-based matchers may be used instead or in addition to an analytic model.

The AI component can also employ any of a variety of suitable AI-based schemes in connection with facilitating various aspects of the herein described innovation. Classification can employ a probabilistic and/or statistical-based analysis (e.g., factoring into the analysis utilities and costs) to predict or infer an action that a user desires to be automatically performed. The AI layer can be used in conjunction with the security layer to infer changes in the data being transferred and make recommendations to the security layer as to what level of security to apply.

For example, a support vector machine (SVM) classifier can be employed. Other classification approaches include Bayesian networks, decision trees, self-organizing maps, and probabilistic classification models providing different patterns of independence can be employed. Classification as used herein also is inclusive of statistical regression that is utilized to develop models of priority.

The disclosed and described components, for example in connection with matching or inference tasks, can employ various artificial intelligence-based schemes for carrying out various aspects thereof. For example, inference or likely search terms or matching of topological maps or sets of demographic information, among other tasks, can be carried out by a neural network, an expert system, a rules-based processing component, a simulation model, decision tree, or a support vector machine.

A classifier is a function that maps an input attribute vector, $X=(x_1, x_2, x_3, x_4, \ldots x_n)$, to a confidence that the input belongs to a class, that is, $f(X)=\text{confidence}(\text{class})$. Such a classification can employ a probabilistic and/or statistical-based analysis (for example, factoring into the analysis utilities and costs) to prognose or infer an action that a user desires to be automatically performed. In the case of a page-biased search system, for example, attributes of a reference set of information to be used in a comparison can be used to determine whether a similar set can be considered to match the reference set. Similarly, a case-based reasoning engine can be used to establish a match between an input attribute vector and a stored reference set.

A support vector machine (SVM) is an example of a classifier that can be employed. The SVM operates by finding a hyper-surface in the space of possible inputs, which hyper-surface attempts to split the triggering criteria from the non-triggering events. Intuitively, this makes the classification correct for testing data that is near, but not identical to training data. Other directed and undirected model classification approaches include, for example, naive Bayes, Bayesian networks, decision trees, and probabilistic classification models providing different patterns of independence can be employed. Classification as used herein also includes statistical regression that is utilized to develop models of priority.

As will be readily appreciated from the subject specification, components disclosed or described herein can employ classifiers that are explicitly trained (for example, by a generic training data) as well as implicitly trained (for example, by observing user behavior, receiving extrinsic information). For example, SVMs are configured by a learning phase or a training phase within a classifier constructor and feature selection module. Thus, the classifier(s) can be used to automatically perform a number of functions including but not limited to ranking search results.

Moreover, those skilled in the art will appreciate that the above-described components and methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. Certain illustrated aspects of the disclosed and described components and methods may also be practiced in distributed computing environments where certain tasks are performed by remote processing devices that are linked through a communications network or other data connection. However, some, if not all, of these aspects may be practiced on stand-alone computers.

In a distributed computing environment, program modules may be located in local and/or remote memory storage devices. The functions described above may be located in a single processor located at the equipment 102 or located a distance from the equipment and sensing component 104. Additionally, the functions can be distributed over multiple processors that communicate using wired or wireless communications or over backplane architecture or a combination of wired, wireless, and backplane configurations.

Figure 3:
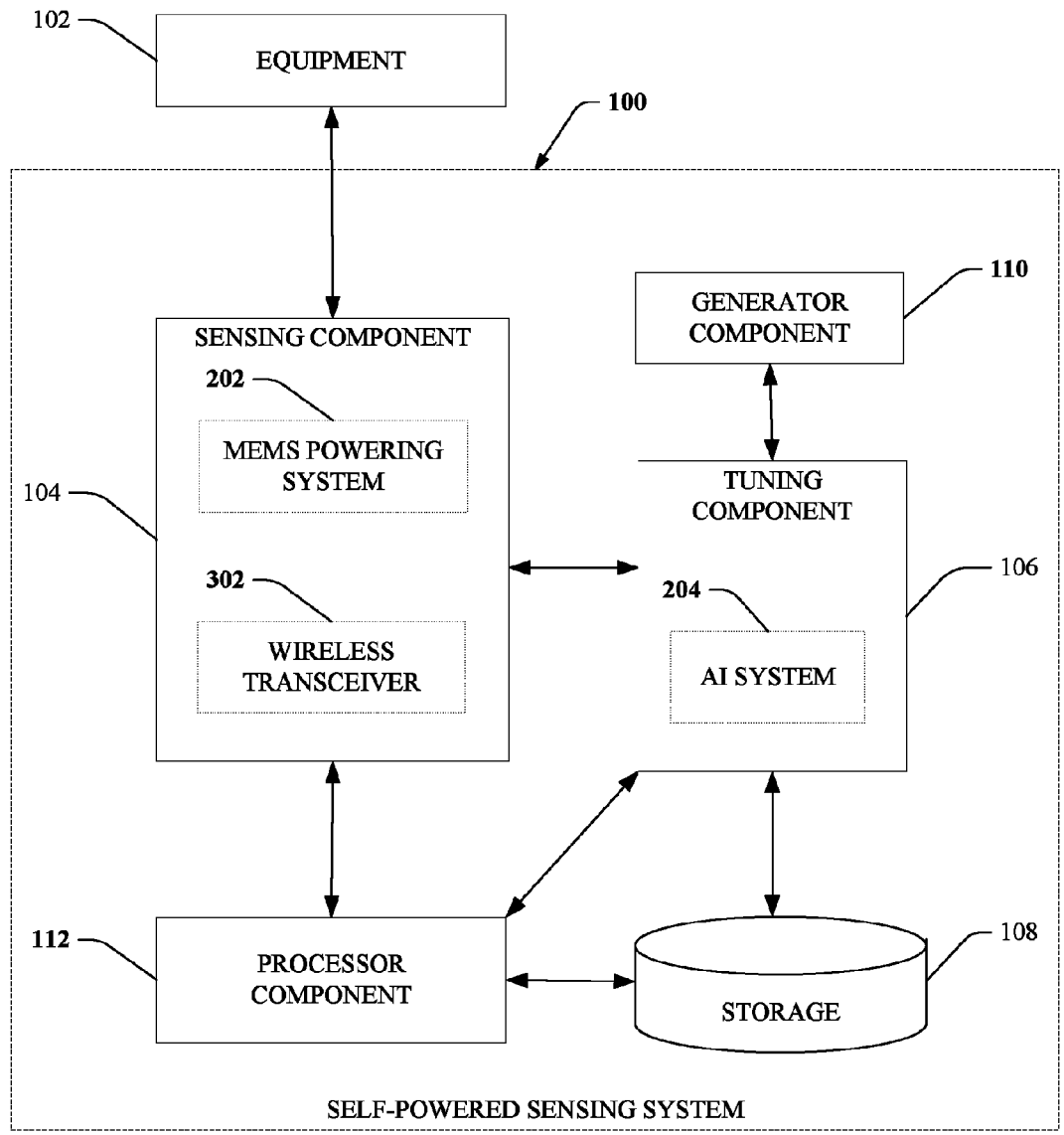
FIG. 3 depicts a block diagram representing a self-powered sensing system including a Wireless Transceiver of the Sensing Component.

Returning to the drawings, FIG. 3 again depicts a self-powered sensing system 100 including a wireless transceiver 302 as another aspect of a sensing component 104. The wireless transceiver 302 provides communication capabilities between the self-powered sensing system 100 and the data server 1420 or another self-powered sensing system 100 or another wired or battery powered sensor node or a data concentrator or a computing node. Information describing the state of the equipment or environment is transmitted from the self-powered sensing system 100 to the data server 1420 or another self-powered sensing system 100 or another wired or battery powered sensor node or a data concentrator, or a computing node or configuration information can be transmitted from the data server 1420 to the self-powered sensing system 100. In another aspect of the subject invention, control information can be transferred from one self-powered sensing system 100 to another self-powered sensing system 100 allowing the self-powered sensor systems 100 to operate redundantly or in a switching mode to allow one unit to recharge while the other is monitoring the equipment 102.

Alternatively, the self-powered sensing system 100 can operate in a complementary manner with one or more self-powered sensing systems 100. Extending this further, the self-powered sensing system 100 can operate in a collaborative manner with another self-powered sensing system 100. Information extracted from each self-powered sensing system is exchanged with the other self-powered sensing system and each node analyzes the summary information available and establishes conclusions, identifies likely equipment states, provides increased information on machinery failure, reduces uncertainty and entropy of system states, and identifies the need for additional sensing and analytic results. The additional sensing and analytic results can be pursued independently or collaboratively with each of the self-powered sensing nodes.

Sensing node collaboration can be performed with two or more self-powered sensing systems 100. The protocol and architecture for sensor node collaboration can adhere to the organization employed with holonic systems and may be further extended to adhere to node collaboration and goal-seeking paradigm prescribed as intelligent agents or autonomous agents or collective intelligence. The sensor node-to-sensor node interaction may follow an arbitrary protocol or may adhere to an open standard for agent collaboration such as defined by FIPA (Foundation for Intelligent Physical Agents, www.fipa.org). The wireless transceiver can operate by any wireless technology such as but not limited to IEEE 802.11 a/b/g/n or Bluetooth technology, IEEE 802.15.4 or Zigbee technology.

Figure 4:
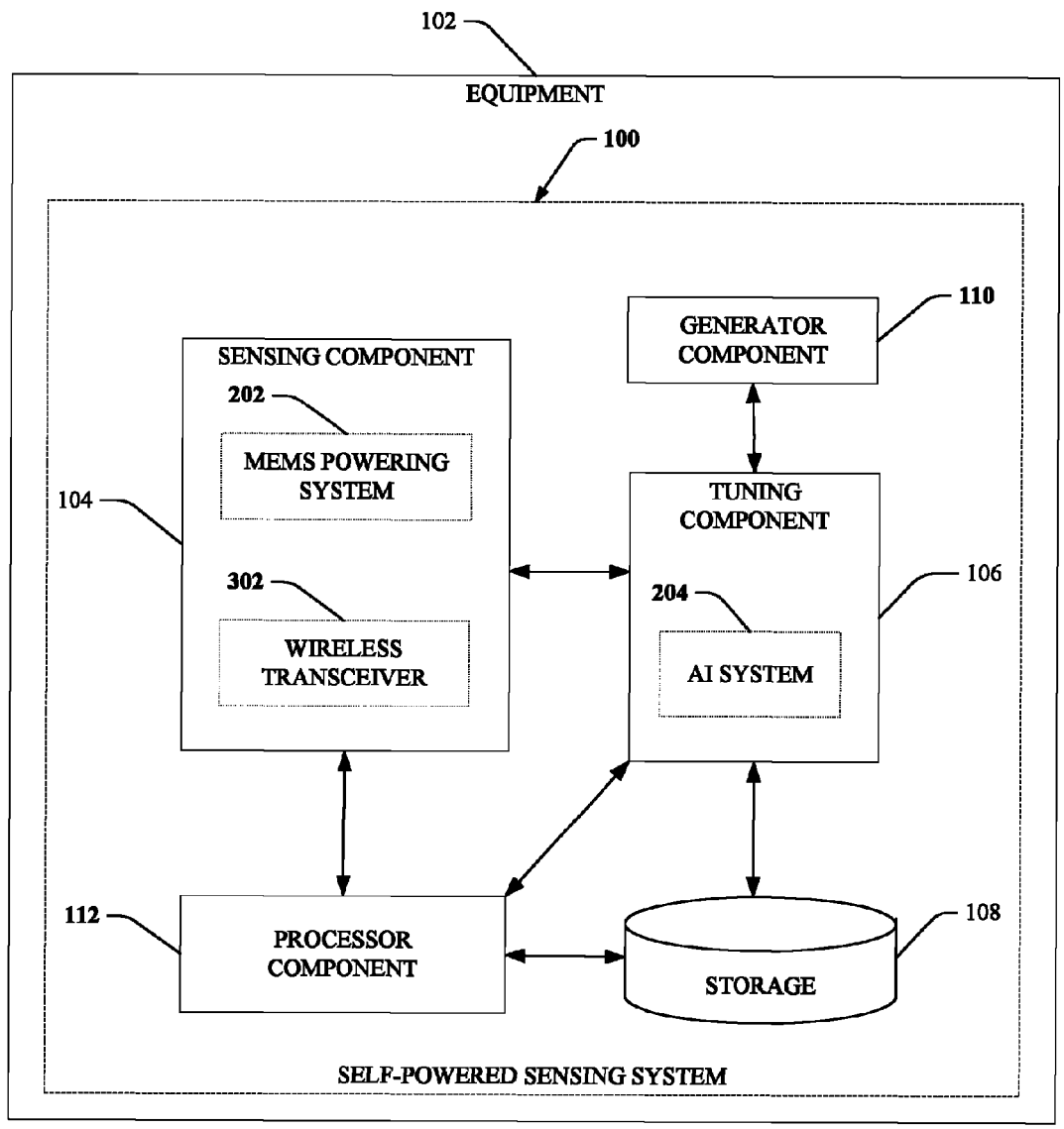
FIG. 4 depicts a block diagram of a self-powered sensing system imbedded in the equipment being monitored.

Referring to the drawings, FIG. 4 depicts an embodiment where the self-powered sensing system 100 is embedded in the equipment 102. Since power is scavenged from equipment vibration, there is no need to connect wires to power the sensing system 100 and there is no need for batteries for power and therefore no need to access the device for periodic battery replacement. The components of a self-powered sensor system 100 can be installed internal to the equipment to provide extra protection from a harsh external environment, to permit monitoring a critical parameter such as vibration or temperature near the critical component or near the desired sensing location or to avoid potential problems with equipment 100 shipping requirements. Additionally, the embedded installation of the self-powered sensing system can provide easier implementation based on assembly requirements.

Figure 4A:
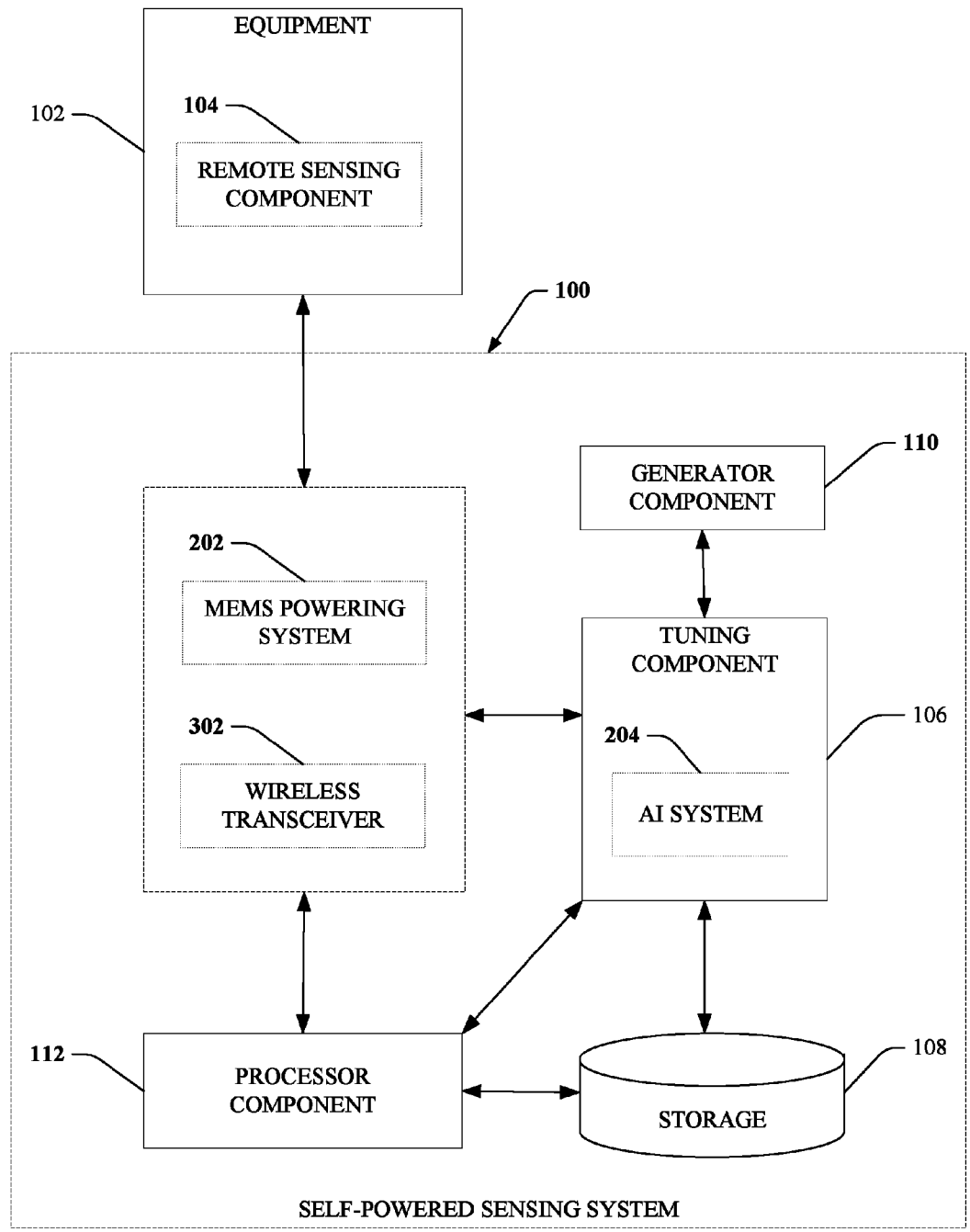
FIG. 4a depicts a block diagram of a self-powered sensing system with the sensing component imbedded in the equipment being monitored.

Alternatively, the power generating or sensing component 104 may be mounted on the machinery providing the useful vibration or vibration of interest and the other components may be separated from the sensor mounting location as shown in FIG. 4*a*. Other electrical components that do not require vibration maybe placed at another location on the machinery or located off the machine being monitored and mounted on a different machine such as in a conduit box, on a mounting base, or an electrical cabinet for example.

Figure 5:
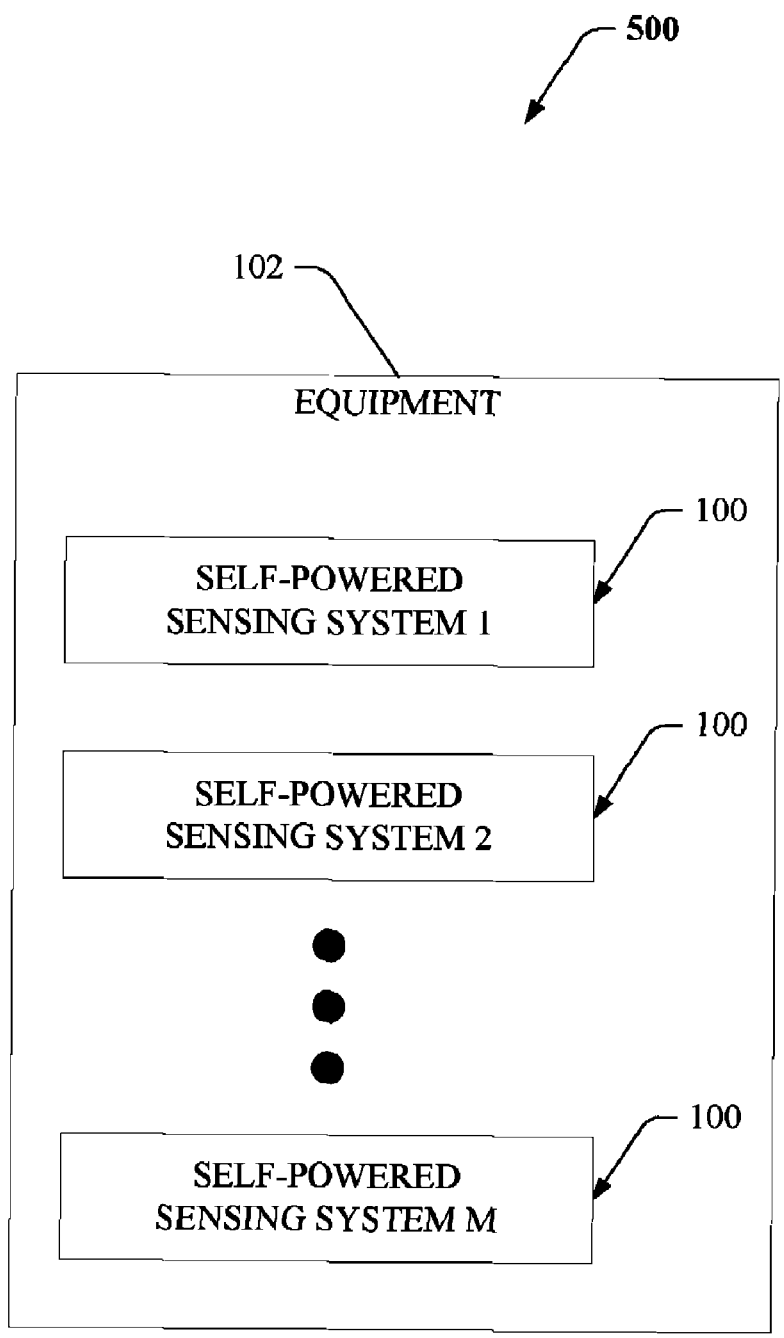
FIG. 5 depicts a block diagram of multiple self-powered sensor systems imbedded for collaborative operation in the equipment being monitored.

In another embodiment depicted in FIG. 5, a plurality of self-powered sensing systems 100 can be installed as part of the equipment. As previously described, the self-powered sensing systems 100 can be installed inside the equipment 100. A series of self-powered sensing systems 100 can be installed to monitor different areas of vibration of the equipment 100. For instance, the equipment can be a large motor with a shaft supported by a series of bearings requiring self-powered sensing systems 100 at each bearing location.

In another embodiment, multiple self-powered sensing systems 100 can be installed in a mission critical application requiring redundancy because the equipment 102 is unapproachable after installation. In a further embodiment, multiple self-powered sensing systems 100 can be installed in equipment with marginal vibration characteristics allowing one self-powered sensing system 100 to operate while others divert all generated power to the energy storage component 814. The active self-powered sensing system 100, communicatively coupled to the sleeping self-powered sensing systems 100 can then awaken a sleeping self-powered sensing system 100 and transfer control and scheduling information so the next data collection cycle is performed in turn by a different self-powered sensing system 100 allowing a rest-cycle to work-cycle exchange between the self-powered sensing systems. The collaborative operation allows a series of self-powered sensing systems to operate in an equipment 102 vibration environment that would not permit the operation of a single self-powered sensing system.

In another embodiment of multiple self-powered sensing systems 100 installed within the equipment 102, in circumstances permitting the close proximity of installation of the self-powered sensing systems, a wired connection can be established between the devices to permit the sharing of power and data communications without the power expense of enabling the radio transmitter. The linkage between multiple self-powered sensing systems 100 permits more reliable operation due to component redundancy. For example the failure of a wireless radio in one unit may result in data communications for the failed node to be sent to an adjacent node via a wired data link and data aggregated and transmitted using a working wireless radio link. The wired connection as used herein includes functionality that can be shared across multiple components, systems, and or networks. One or more self-powered sensing systems 100 can communicate and cooperate with different network devices across a network. This can include substantially any type of control, communications module, computer, I/O device, Human Machine Interface (HMI) that communicate via the network which includes control, automation, and/or public networks.

The self-powered sensing device 100 can also communicate to and control various other devices such as Input/Output modules including Analog, Digital, Programmed/Intelligent I/O modules, industrial controllers, communications modules, and the like. The network can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Each of the self-powered sensing systems in FIG. 5 can have a unique complement of sensors and analytic routines directed at measuring one or more particular components or conditions of the monitored equipment 102. The operation of each sensing system may be directed at obtaining information about a specific component or fault mode of equipment. Each self-powered sensor system may also have a target level of information entropy it operates to achieve about the fault's state and the assessment of machine or component health information may be communicated to one or more other self-powered sensing system. The receiving sensing systems can use this information to improve upon their health assessment and further reduce the entropy of machinery condition assessment.

In another aspect of the subject invention, multiple self-powered sensing systems 100 can be communicatively coupled to a centralized control system and to each other. The centralized control system can provide the intelligence to instruct the self-powered sensing systems 100 to operate in unison or for one self-powered sensing system 100 to provide information or power to another self-powered sensing system 100. In another aspect, the centralized the collection of self-powered sensing systems 100 can share information to allow the collective of self-powered sensing systems 100 to operate at an efficiency level unobtainable by the individual efforts of the self-powered sensing systems 100.

Referring now to FIG. 5a, one or more self-powered sensing systems can be installed on multiple machines or equipment where the machines are coupled or mechanically (e.g. shared foundation or structure), linked due to the environment (e.g. share ambient noise, pressure, vibration, and temperature), process machinery (e.g. shared piping across multiple pumps, valves, and filters), or process material (e.g. shared process material such as a pumped fluid or a steel web of material being coated). Information from the multiple sensing systems on the multiple machines may have their operation directed to enhance machinery and process condition assessment and to reduce the information entropy. Information may be communicated among the different machines to further enhance the diagnostic accuracy and further reduce system entropy.

The architecture of a system shown in FIG. 5a may be any of the known distributed system architectures including hierarchical or network architecture. For example one of the self-powered sensing nodes may operate as the central controlling or supervisory node and other nodes receive direction from this node and submit data and analysis results back to this node. Alternatively, the architecture of the system depicted in FIG. 5a may be one of distributed autonomous agent architecture. In this architecture, each self-powered sensing node has a local objective such as to determine the condition of its local machine or component plus the responsibility to collaborate to achieve higher level or system goals. This may cause a sensor node agent to sample data it does not need but provide this data to other nodes unable to sample this data to assist the other nodes in their analysis. The decision to sample and exchange this data among nodes is not determined by a central program but rather this is established through node-to-node collaboration and negotiation.

Figure 6:
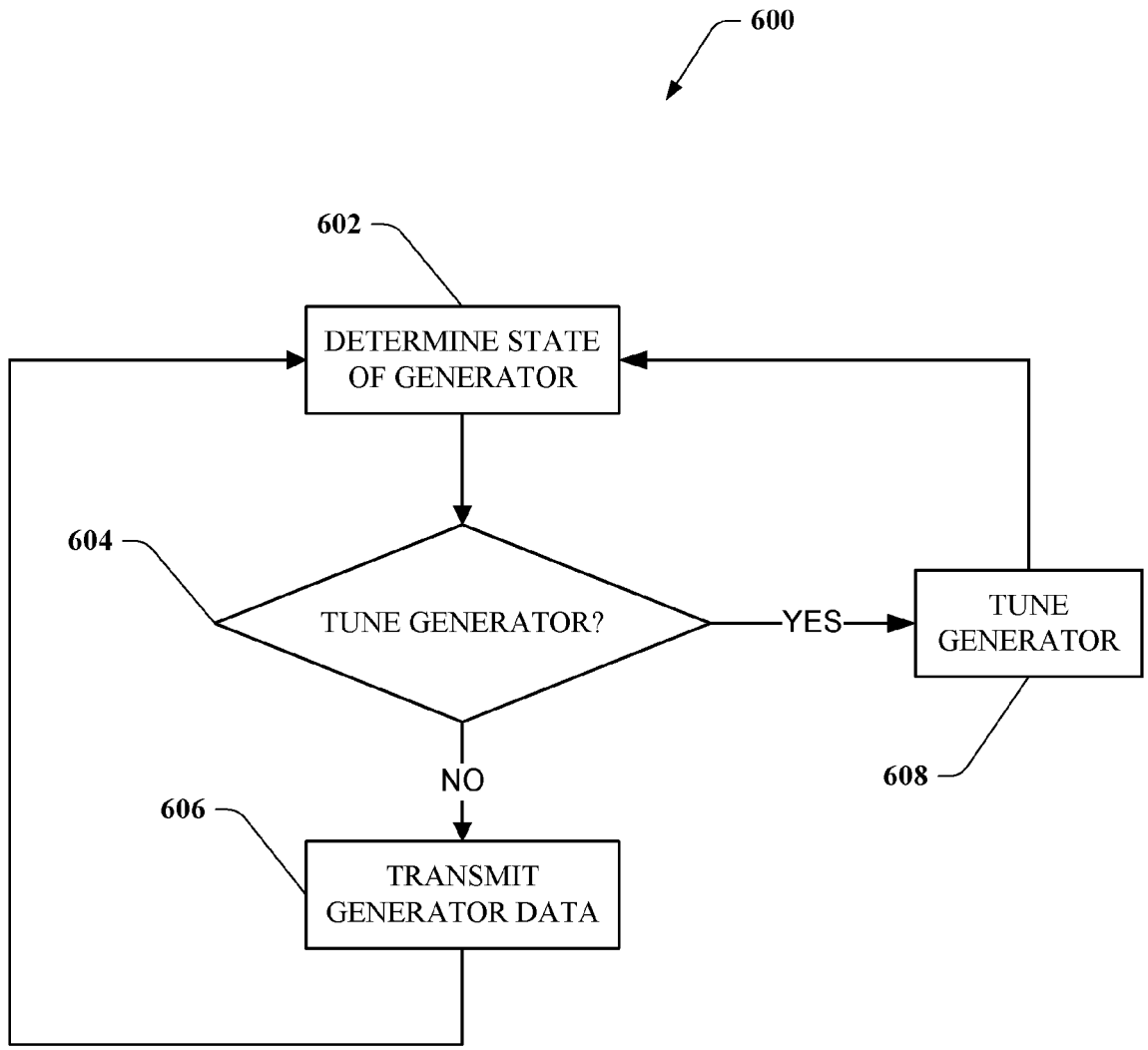
FIG. 6 depicts a flow chart of the operation of a self-powered sensor balanced between optimizing power generation and transmitting information.

Referring again to the drawings, FIG. 6 depicts an embodiment of the operation of the self-powered sensing system 100 during a cycle of data sampling and analysis. In one aspect of the operation the self-powered sensing system 100 determines the state of the generator 602. The state determination allows the collection of vibration data and the determination of available power. The self-powered sensor system next analyzes the collected data to make a determination of whether to tune the generator based on the need for additional power or the need to reduce system entropy 604. If the analysis dictates tuning the generator 608, then the self-powered sensing system 100 optimizes the generating capabilities of the self-powered sensor system while extracting maximum information from the tuning process and continues to the next cycle of determining the state of the generator 602. If the analysis determines power generating capabilities are within acceptable limits and state information is known with a suitable level of certainty, then the self-powered sensing system 100 proceeds to transmit the analyzed information to the server 1420 or to other self-powered sensing systems 100. A more detailed description of the data collection and analysis cycle including the quiescent state is presented next.

In another aspect of the subject invention, the entropy information is used to provide for fault tolerance. For example, if the self-powered sensing system 100 detects that the entropy of the system is rising then the self-powered sensing system 100 can adjust the control strategy to a more conservative approach that will reduce stress on the system until the system entropy value returns to a satisfactory level. Additionally, the calculated entropy value can be used to provide increased safety and security because equipment is not permitted to operate until failure. The calculated system entropy value can also be used to promote greater sensor validation and reallocation of resources such as processor and communication bandwidth. Based on the calculated system entropy, the self-powered sensing system 100 can direct a controller to dynamically change system parameters such as speed, temperature and deviation from set points and probe the system by perturbing the system with regards to injecting a stimulus into the system and observing the system response. In another aspect, process conditions can be modified to optimize the system entropy value. The calculated entropy can also be the basis for goal directed agent reconfiguration and by proxy establish the entropy of the machine state, process condition, disturbances or the manufacturing system or process being controlled.

Figure 6A:
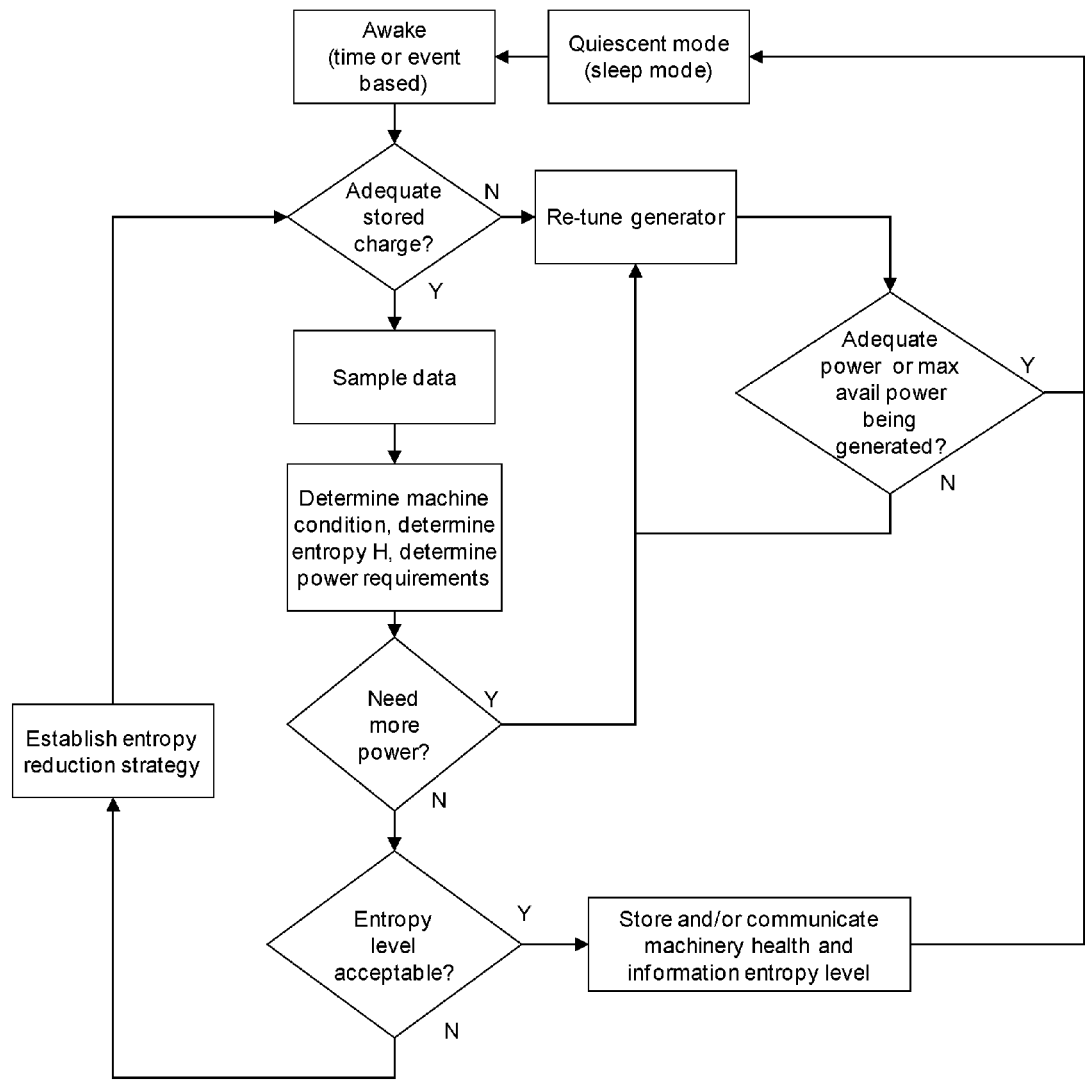
FIG. 6a depicts a flow chart of the operation of a self-powered sensor balanced between optimizing power generation and transmitting information using Entropy reduction as a strategy for balancing.

Referring to FIG. 6a, whenever system processing is completed and there are no critical conditions requiring continued sensor node operation, the system is put into a background state or quiescent mode sometime referred to as in "sleep" mode. Quiescent mode requires minimal power such as only to retain memory. This mode significantly reduces the power consumption. Meanwhile, while processor operation is suspended, power scavenging continues to operate and build up electrical charge for subsequent node operation. Based on elapsed time or an event, the system transitions from the quiescent state to an active, operating state. Note the time period scheduled for wake-up can change based on the condition of the equipment, the amount of power available, the rate of power generation, the level of information entropy required, the rate of entropy increase without sensor node operation, or other condition requiring timely processor activity.

The first action of the sensor is to determine the state of power available and the amount of power currently being generated. If inadequate power is available the system immediately transitions to retuning the generator. This step is performed before any sampling, data analysis, or communications to help insure node survival. If power levels are critically low and retuning does not correct the problem, the sensor node may send out a distress message to notify other nodes or notify operations staff that a node failure due to inadequate power is eminent.

Continuing now with FIG. 6a, if adequate stored power is available, activities that operate the one or more sensors to acquire sampled data is performed next followed by data filtering, other signal processing, and data analysis such as to estimate the condition of the machine or the state of the system. The sampling and data analysis steps are core to the operation of the self-powered sensor node. The information entropy, H, is them calculated. After data sampling and data processing, a check is made to determine if adequate reserve power is available for continued operation and if adequate power is currently being generated. If stored, reserve power is low or if the generator is not providing adequate power levels, system immediately suspends further data processing and operates to increase the power being generated. Otherwise, if adequate power levels exist, the value of the entropy level, H, is interrogated. If the information level is adequate, then the system saves or communicates the machinery condition information and reverts back to the quiescent mode.

It is worth noting that the sleep time may be changed dynamically based on the adequacy of the information entropy or the rate of information loss during periods of sleep. For example, a dynamic system may have the system state change rapidly and cause the information about a system to quickly lose validity during a period of no system observation. In cases such as this where information entropy increases relatively quickly, a shorter sleep time may be prescribed. Alternatively, a stable system with very slow, gradual changes in system state may permit much longer sleep cycles. The prescribed sleep cycle can be changed dynamically based on the estimated system state, the entropy level, or the expect rate of change in entropy.

Referring again to FIG. 6a, if the estimated entropy level H, is determined to be inadequate, additional data can be acquired from the system and further analysis can be performed to gain more information about the state of the system and reduce system uncertainty. This will permit establishing the system state with a greater probability of being correct. The additional sampling and data analysis needed can be estimated in order to reduce system state uncertainty and provide the needed additional state information. Since various sensing, processing, or communications techniques can be used to reduce state uncertainty, an entropy reduction strategy is formulated to provide the required level of entropy reduction with minimum energy expenditure. For example, the sensor can be sampled multiple times and the readings averaged to improve the accuracy of the sampled data.

In addition, the data analysis activities could perform more complex analysis including statistical analysis, or model-based comparisons, or regression analysis, or intelligent systems techniques (e.g. artificial neural net classification algorithms) to suitably reduce the uncertainty in the estimated system state or faulty condition assessment. This process may iterate multiple times subject to time and power constraints. Details describing strategy formulation will be described later. Following additional sensor node processing the previous entropy level is updated to reflect the additional information or certainty gained. The updated entropy level may be considered acceptable if the value is below a prescribed threshold value or if subsequent iterations fail to reduce the information entropy substantially and do not provide additional state information.

Figure 6B:
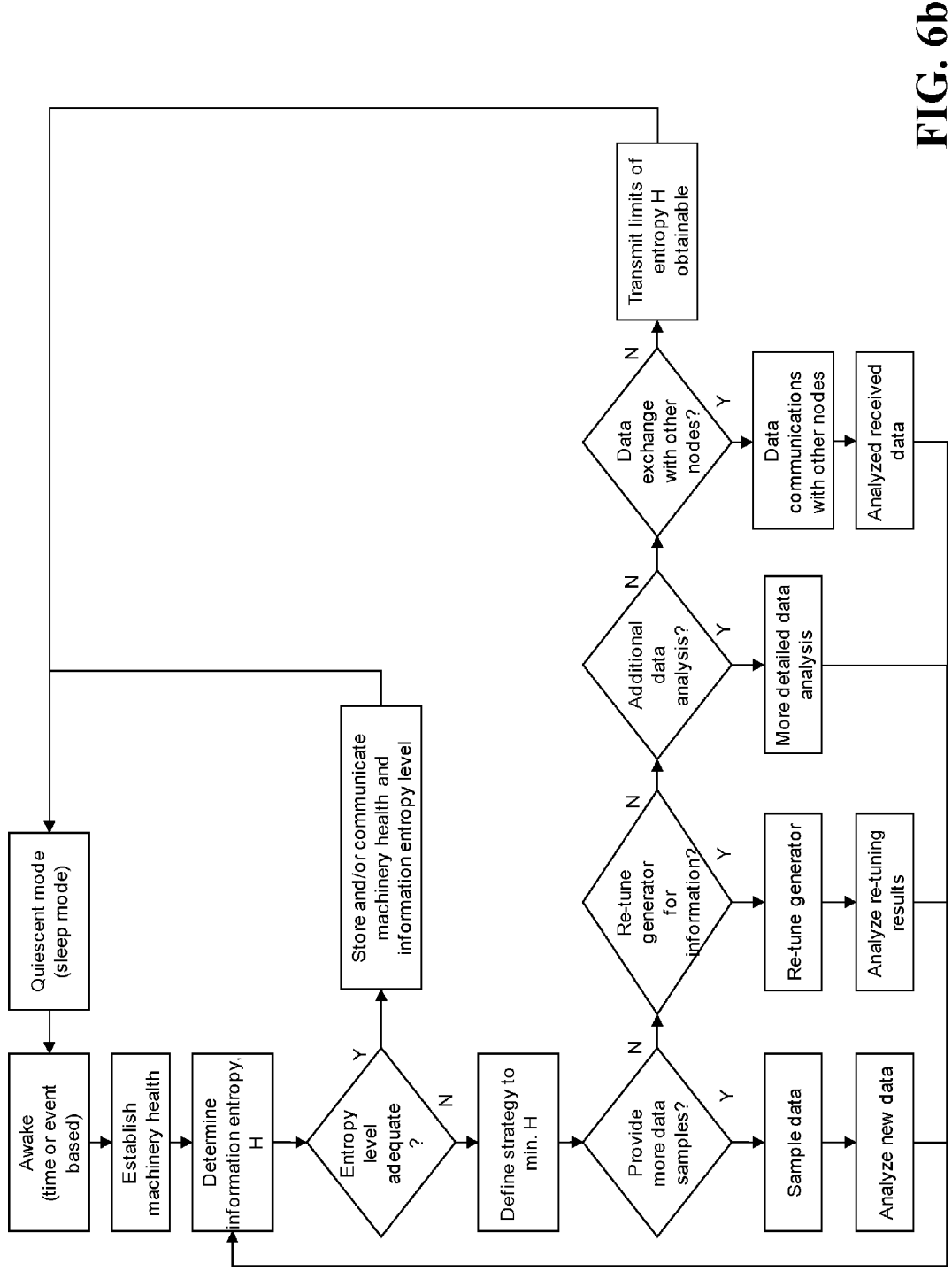
FIG. 6b depicts a flow chart of the operation of a self-powered sensor balanced between optimizing power generation and transmitting information using Entropy reduction and information shared between nodes as a strategy for balancing.

Referring now to FIG. 6b, given the estimated state of the system determined by the self-powered wireless sensor node and the estimate of the state certainty provided by the estimated information entropy H, a check is made to determine whether a suitable level of information certainty exists. If so, the sensor node transitions to the quiescent state and the cycle of sleep, sample, analyze, diagnose, check entropy, and sleep continues. If the state information is not known to an acceptable level of certainty, a strategy must be formulated that prescribes what subsequent sampling, processing, or communications may be needed to reduce the information entropy to an acceptable level.

Establishing a strategy comprised of additional sensor node actions is most effectively done if a prediction is made regarding the expected reduction in entropy for a given expenditure of energy. A model-based approach for selecting an appropriate entropy reduction strategy may be used to optimize sensor node operation. A given strategy may be comprised of specific sensor node actions to be performed. For example, as shown in FIG. 6b, if the strategy determines that additional sensor data is required, then the sensor node will read in additional values from the sensor on the equipment. The sensor values may be analyzed alone or in conjunction with any previous samples collected. Additional filtering, signal processing, or analysis may be performed and the results obtained used to affect the certainty of the estimated equipment state.

Alternatively, it may be determined that operating the generator and monitoring the results from retuning is the best operating strategy. For example, the generator may be tuned so its resonant frequency matches the gear mesh frequency of gearbox it is attached to. Combining generator performance information with sensor signal data may efficiently provide information to improve the certainty of the equipment state estimate. Similarly, it may be determined that additional processing using existing data is the most effective way to reduce information entropy. For example, entropy may be reduced with minimum energy by performing a linear regression on the data or transforming the data to the frequency domain and extracting the amplitude at critical frequencies.

Similarly, it may be more efficient to exchange and compare information from other wireless sensor nodes. Processing to reduce information entropy will be carried out in an iterative manner until an acceptable level of entropy is obtain or it is determine not possible to achieve the desired entropy level. It may not be possible to reduce information entropy to acceptable limits due to limited sensor capabilities, analysis capabilities, processing time, or power constraints. In this case, the best attainable entropy value will be provided and the system will enter quiescent state and suspend processing until the next processing cycle starts as shown in FIG. 6b.

Figure 7:
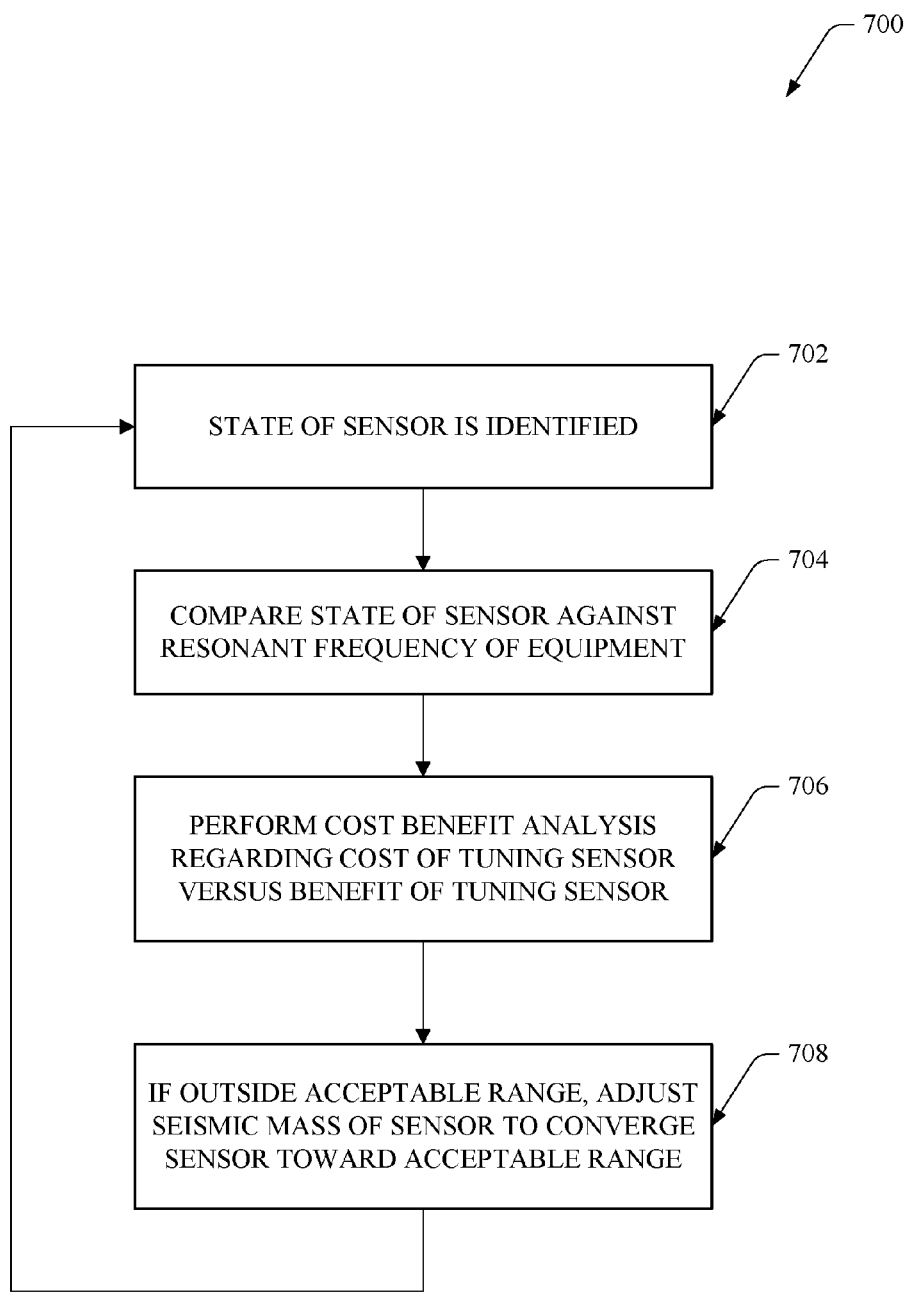
FIG. 7 depicts a flow chart of deciding when to optimize power generation.

In another embodiment depicted in FIG. 7, the data analysis with respect to a determination of whether to tune the power generating system is depicted. The first step is determining the state of the sensor system 702. The vibration characteristics of the power generator component 808 are compared 704 with the vibration characteristics of the equipment 102 to determine if the resonant frequency of the generator is sufficiently near the equipment vibration frequencies containing the most energy. Additionally, the output of the generator component 808 is compared 704 to the known theoretical maximum power generating capability. An analysis is then performed 706 to balance the expected benefit in additional power generation against the expected cost in power reserves of tuning the generator component 808. If the cost benefit analysis 706 determines the generator is outside of its acceptable range of operation 708 and re-tuning the generator is a prudent expenditure of energy and adequate reserve power exists then the self-powered sensing system 100 adjusts the seismic mass 904 to improve or optimize the power generating capabilities of the self-powered sensing system 100. A more detailed description of the components and their operation are provided further in the specification.

A model of the generator can be employed to predict the mechanical and electrical characteristics of the generator at the proposed new tuning condition in response to the current or expected vibration energy spectrum of the machinery. The new expected power generating levels will provide a basis for determining if a suitable power return can be achieved with the required expenditure of energy. Minor adjustments can be made to generator tuning in order to closely track the machinery vibration containing the most energy. The strategy for tuning may prescribe that the system be tuned slightly away from the machinery vibration frequency with the most energy due to the knowledge that the machinery vibration characteristics will likely change and the machinery vibration pattern will transition in the future to the desired condition where the generator operates at peak efficiency. The expected power generation capabilities and expected energy investment provides the basis for making a change in the location of the seismic mass. Following execution of the specified tuning strategy, an assessment can be made to confirm the accuracy of the expected investment in energy and the expected power generation levels. The observed errors between the actual energy values and the predicted values may be used to adaptively refine and improve the modeling and prediction accuracy of the tuning model.

Figure 8:
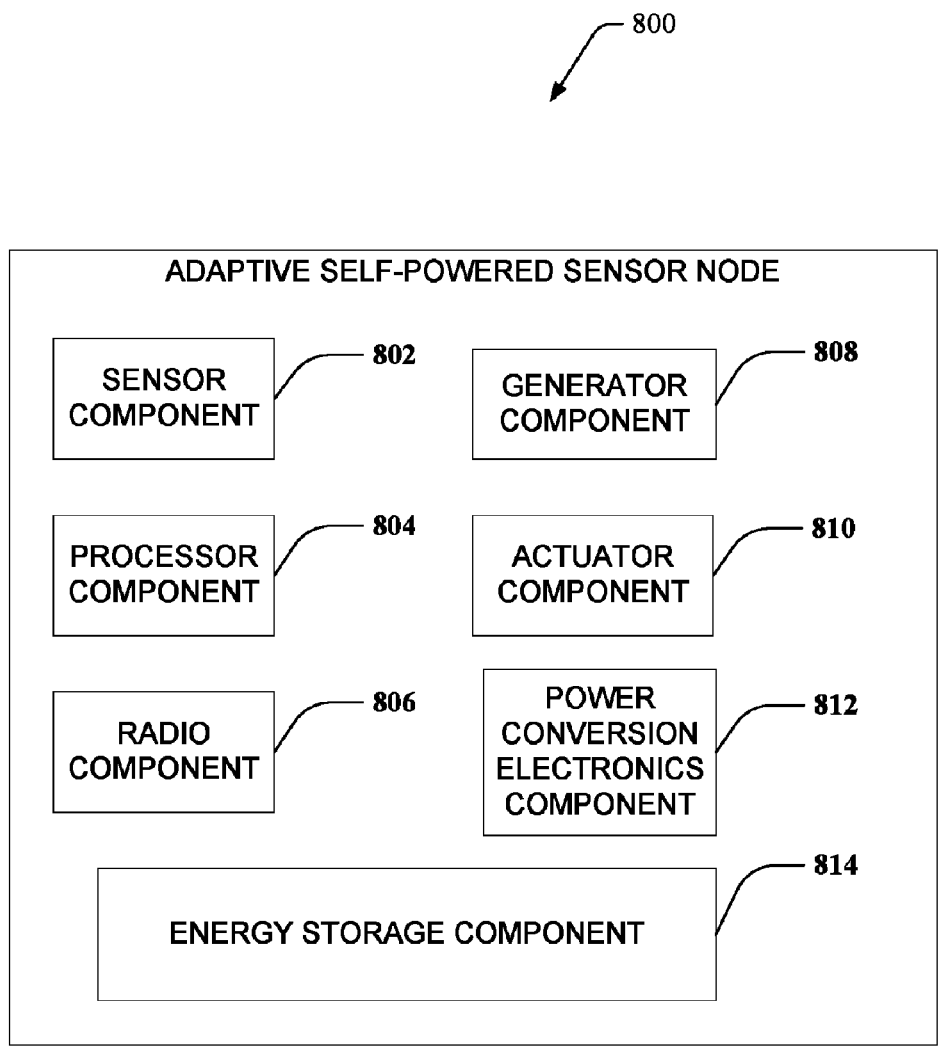
FIG. 8 depicts a block diagram of an adaptive self-powered sensor node.
Figure 8A:
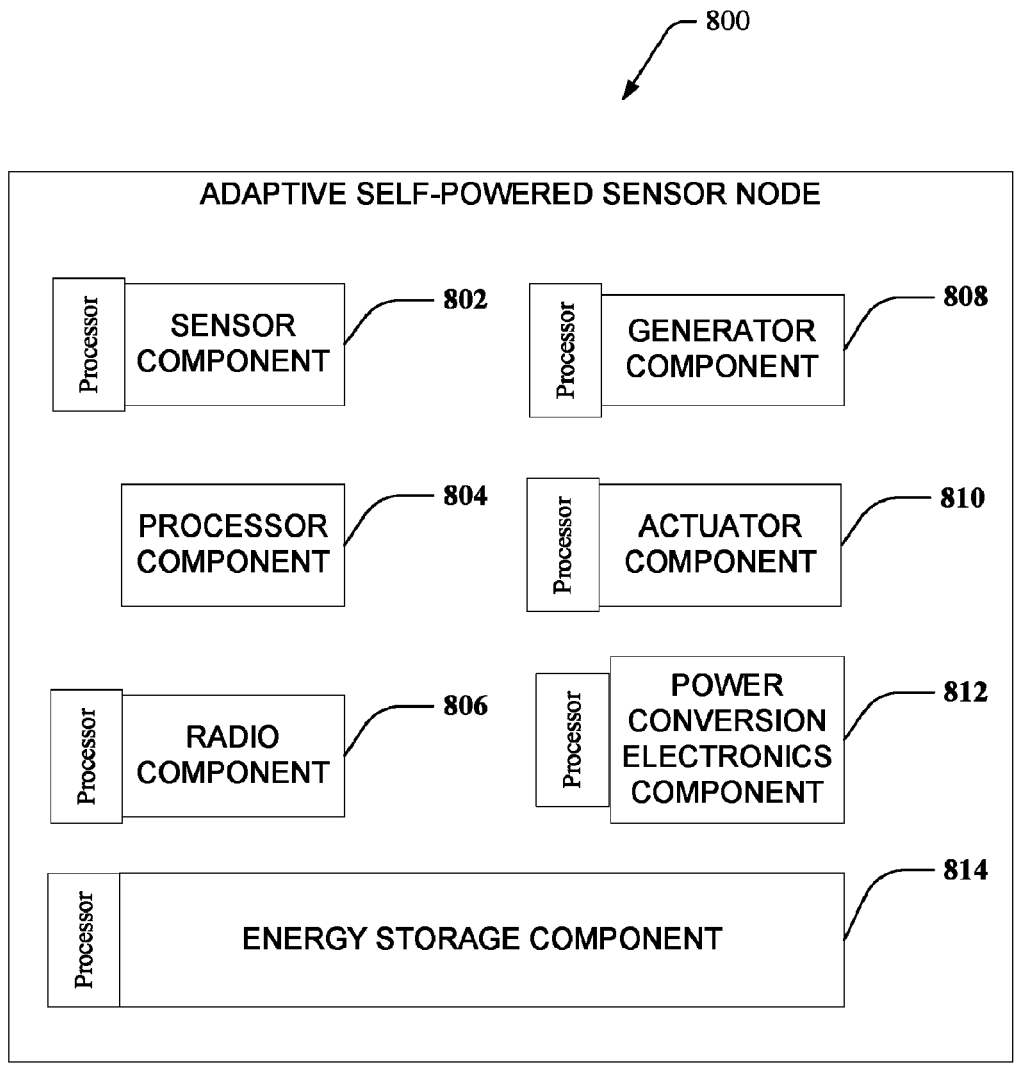
FIG. 8a depicts a block diagram of an adaptive self-powered sensor node with dedicated processors for each component.

Referring again to the drawings, FIG. 8 depicts a block diagram of an adaptive self-powered sensor node 800. In one aspect, the adaptive self-powered sensor node 800 comprises a sensor component 802, a processor or microcontroller component 804, a radio component 806, a generator component 808, an actuator component 810, a power conversion electronics component 812 and an energy storage component 814. The primary purpose of the actuator component 810 is to adaptively tune the generator component 808 to increase the amount of energy generated. Additionally, a local display device such as an LED, LCD, or other visual indicator may be included with the sensor module. An output actuator (not shown) such as but not limited to a relay, a switch, a buzzer, or contact closure can be integral to the sensor node 800. Lastly, one or more analog and/or digital outputs may be incorporated into the wireless sensor node. The value of the analog or digital output may indicate the condition of the equipment, the power level currently being generated, the amount of stored power, future power needs, the information entropy level, the operating mode of the device, the condition of the monitored device or machine, or other information related to the current, past, or predicted environment, equipment, or sensor node.

In one aspect of an adaptive self-powered sensor node 800, a sensor component 802 is physically attached to the monitored equipment. Examples of monitored equipment include but are not limited to motors, generators, pumps, gears, bearings, rollers mills, structures, bridges, machine centers, railroad cars and locomotives, aircraft, vehicles, ships and other marine equipment, compressors, turbines, and engines. Furthermore, monitoring targets may include animals or humans that may be monitored for condition and may also provide movement used by the generator for generating energy. In another aspect of the self-powered sensor node 800, a sensor component 802 may be in the vicinity of the monitored equipment but not directly attached. Examples of non-contact sensing include infrared sensing, optical interference detection, and acoustic sensing.

The sensor component 802 can be an accelerometer that detects vibrations emanating from the equipment and measures the amplitude and/or the frequency of the vibration. The sensor component 802 is communicatively coupled to the adaptive self-powered sensor node 800 processor component 804 and delivers the collected data to the processor component 804 for further analysis. It should be noted that other sensor components such as but not limited to a temperature sensor can be used in conjunction with sensor component 802 to measure other variables associated with determining an equipment maintenance schedule or predicting equipment component failure.

Data captured and analyzed by processor component 804 may also provide information regarding the condition or the state of the process or the condition of the environment or the condition of the sensor node 800 or the condition of one of the elements that comprise the sensor node including the condition of the sensor node mounting or packaging integrity. For example, the equipment may be operating properly, however, there may be excessive loading of a motor-driven pump due to an unusually high fluid viscosity condition or the vibration levels may be elevated across a broad frequency range due to pump cavitation even though all pump components are in proper condition and not in a failed or failing state.

The sensor component 802, in another aspect of the adaptive self-powered sensor node 800, can be turned on by the processor component 804 at a time the processor component 804 deems necessary for collecting data. Once the sensor component 802 has collected vibration data satisfying the needs of the request, processor component 804 can turn off sensor component 802 to conserve energy allowing generator component 808 to direct more energy to energy storage component 814.

Additionally, sensor component 802 may be operated in several modes depending on the data sampling and data analysis needs. If sensor component 802 is an accelerometer, it may be operated very briefly to establish the average or RMS vibration amplitude of the machine to confirm there is no major equipment fault or out-of-balance condition. Alternatively, sensor component 802 may be operated to capture a large number of samples for a very short time. The processor component may convert this data to the frequency domain such as by using an FFT algorithm. The processor component can inspect the FFT results and determine a preferred generator natural frequency. In yet another alternative, the sensor component 802 may be operated at a very low frequency for an extended period to support analysis of trends or low-frequency structural vibrations.

In another aspect of an adaptive self-powered sensor node 800, processor component 804 is the intelligence of the adaptive self-powered sensor node 800. The processor component can be a microcontroller containing its own internal resources for use in operating the adaptive self-powered sensor node 800. The processor component 804 directs all operations of the adaptive self-powered sensor node 800 such as enabling or disabling the radio, turning the sensor component 802 on or off as described supra, analyzing the data collected from the sensor component 802, establishing the entropy of the information representing the state of the equipment, predicting future power needs, estimating energy required to reduce system entropy, determining when and how often to transmit the information created from analyzing the data to the data collection server component 1420 in FIG. 14 to be described later, tuning the operation of the generator component 808, establishing a strategy to maximize the reduction in information entropy with minimum expenditure of energy, and predicting the future operation of the equipment in relation to the resonant frequency of vibration and the power generating capabilities of the adaptive self-powered sensor node.

The radio component 806, in another aspect of the adaptive self-powered sensor node 800, is communicatively coupled to the processor component 804 and provides the ability to transmit the information, created by the processor component 804 in analyzing the data collected by sensor component 802, to the data collection server component 1420 for storage and further analysis. The radio component 806 can be switched on and off by the processor component 804 to meet the conflicting needs of providing sufficient information to maintain and predict equipment operations and minimizing the power usage by the radio transmitter. The radio component 806 can also include a receiver for receiving commands and configuration information.

In an alternative design, of the adaptive self-powered sensor node 800, there may not be a radio component 806. Instead of the radio component or in addition to the radio component, the self-powered sensor node may store data locally for future data copying, there may exist a wired data communications path or optical data link, the sensor node may provide a local graphical display, it may provide an indicator light or lights, or it may provide an audible alarm of constant volume and frequency or of different or varying volume, frequency, or duty cycle.

In another aspect of an adaptive self-powered sensor node 800, a generator component 808 provides the ability to generate power for use by the components of the adaptive self-powered sensor node 800. The generator component 808 uses a piezo-electric cantilever beam 902 shown in FIG. 9 to generate power from the vibrations induced by the operationally vibrating equipment 1002 shown in FIG. 10. A piezo-electric material is one that produces an electrical charge when the material is deformed or a mechanical strain is applied. As applied to the subject invention, when the cantilever beam, constructed of a piezo-electric material, is forced to oscillate because of the vibration created by the machine, the mechanical strain of the oscillation creates an electrical charge that is captured by the generator component 808 and stored in the energy storage component 818.

Other generator materials and designs may also be employed including capacitive generators, moving magnet-coil generators and photovoltaic cells. The generator component 808 is mechanically connected to the actuator component 810 for linearly indexing a seismic mass 904 attached to the piezo-electric cantilever beam 902 shown in FIG. 9. The processor component 804 communicates instructions to the actuator component 810 to linearly adjust the position of the seismic mass 904 and tune the harmonic resonance frequency of the piezo-electric cantilever beam 902 to match the frequency of the operationally vibrating equipment containing the most energy 1002 in FIG. 10. In this manner, the output of the generator component 808 is maximized. Through power conversion electronics component 812, the power generated by generator component 808 is rectified, converted and filtered as needed for storage in energy storage component 814. Examples of storage components 814 include but are not limited to dry cell batteries, rechargeable batteries, capacitors, supercapacitors, ultracapacitors, or fuel cells (e.g. nickel-hydride fuel cells), Referring again to the actuator component 810. Another aspect of an adaptive self-powered sensor node 800, linearly adjusts the position of the seismic mass 904 along the cantilever axis of the piezo-electric cantilever beam 902 for tuning the harmonic resonance frequency of the piezo-electric cantilever beam 902. The actuator component 810 is communicatively coupled to the processor component 804 and receives instructions from the processor component 804 to extend or retract the seismic mass 904 based on changes in vibration characteristics of the operationally vibrating equipment 1002.

The actuator component 810 optionally provides positional feedback to the processor component 804 insuring that the processor component 804 is always aware of the position of the seismic mass 904. The actuator component can be driven directly from the processor component. The processor component can establish a new, desired resonant frequency of the cantilever beam and establish the required seismic mass location that will provide the desired resonant frequency. The processor may operate the control algorithms and provide the electrical power of the appropriate sign and amplitude to cause the actuator component to move the seismic mass by a pre-defined amount. A simple feedforward or feedback position control loop such as a PID (proportional, integral, and derivative) linear controller can be used by the controller in the processor to increase or decrease the voltage presented to the actuator component until the correct actuator position is obtained. Position feedback information provided to the processor will permit the processor to utilize a simple, feedback control loop.

In another aspect of an adaptive self-powered sensor node 800, a power conversion electronics component 812 receives the power generated by generator component 808 and converts the supplied power to an electrical format compatible with energy storage component 814. The power conversion electronics component 812 then provides the converted power to the energy storage component 814 and manages the energy storage component 814 to assure that its recharging requirements are not exceeded. Power conversion electronics component 812 power charging management tasks include but are not limited to not exceeding a particular charge rate, maintaining the charge at a particular voltage and current within specified limits based on energy storage component 814 specifications, not overcharging energy storage component 814 and not dissipating excessive charging capacity produced by generator component 808.

Figure 9B:
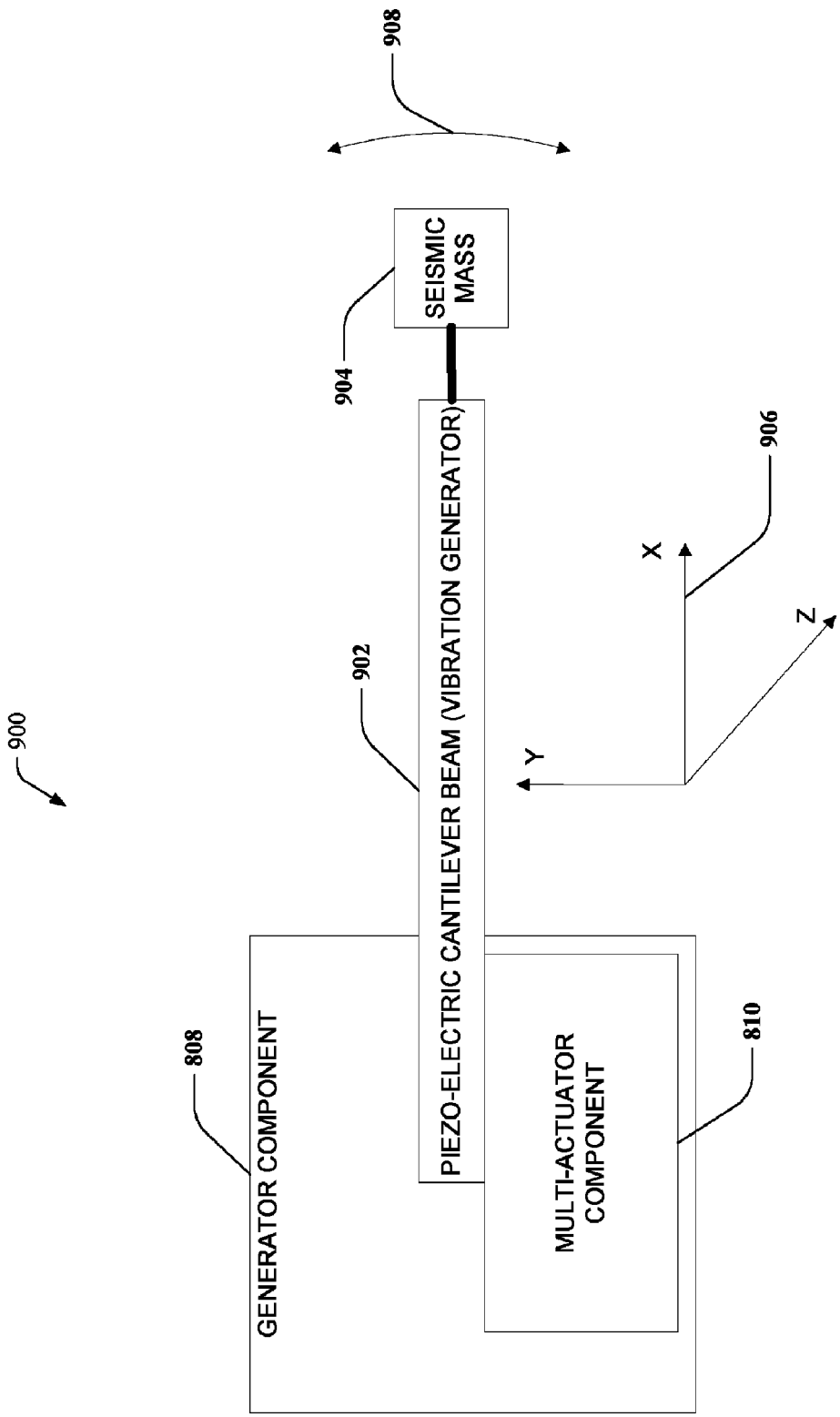
FIG. 9b depicts a block diagram of a piezo-electric generator including the cantilevered arm and the adjustable seismic mass controlled by the linear motion micro-motor actuator showing oscillation in three dimensions.
Figure 9C:
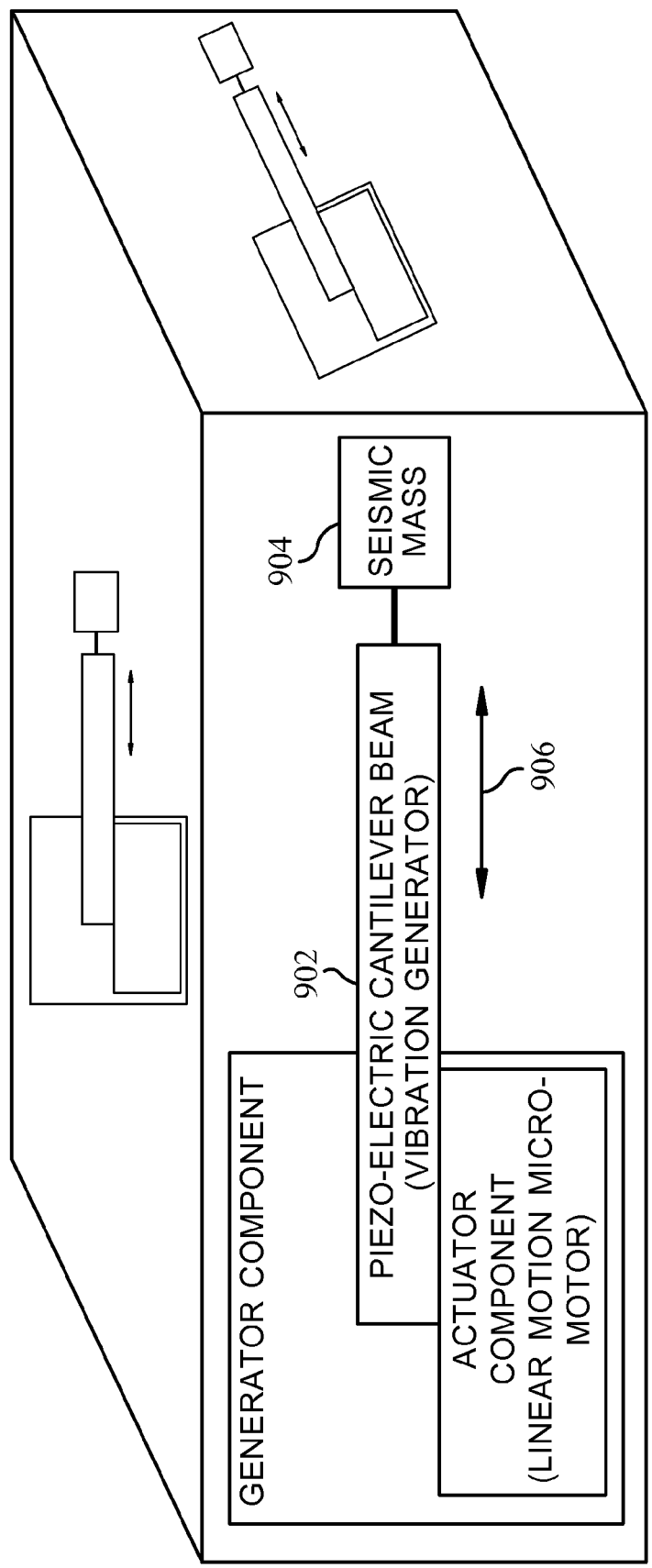
FIG. 9c depicts a block diagram of a piezo-electric generator including the cantilevered arm and the adjustable seismic mass controlled by the linear motion micro-motor actuator showing tuning and optimization in three dimensions.

Additionally, power conversion electronics component 812 manages the extraction of power from the generator component 808 to insure the electrical and mechanical properties of the piezo-electric generator element 902 in FIG. 9 remain at an optimal or near optimal level based on the system vibration frequency and amplitude levels. The power conversion electronics component 814 also provides a power feedback signal to processor component 804 indicating the power generated and the state of the charge of energy storage component 814.

The energy storage component 814, another aspect of an adaptive self-powered sensor node 800, provides energy storage capacity for the power created by generator component 808. During operation of the adaptive self-powered sensor node 800, power may be utilized directly from the generator component 808, it may be used from the power conversion electronics component 812, or power used may be extracted from the energy storage component 814. Energy storage component 814 can be but is not limited to capacitors, supercapacitors, ultracapacitors, fuel cells, and rechargeable batteries. The energy storage component 814 can be created from a single storage unit or may have multiple storage units connected together either in series or parallel. The energy storage component 814 provides the power to operate sensor component 802, processor component 804, radio component 806, actuator component 810 and the power conversion electronics 812 in addition to any other local displays, actuators, or annunciators such as lights, sirens, or buzzers, and relays for opening or closing electrical contacts.

Multiple energy storage components 814 can be used simultaneously. Some of these can be of a non-rechargeable type such as a dry cell battery, others can be rechargeable with external sources such as a micro-fuel cell and others can be chargeable from generator component 808. When multiple energy storage components exist, some can be designated as primary operating energy sources and used for normal operation of the adaptive self-powered sensor node, other sources can be designated and operated as reserve power sources such as during times when the amount of power generated is low, some sources can be designated to operate the actuator component 810, or others designated to operate only the radio, or still others can be designated as emergency backup such that power will be available to transmits a distress message or node failure due to inadequate sustained power message.

Referring again to the drawings, FIG. 9 depicts a detailed view of the operation and interaction of the generator component 808, the actuator component 810, the piezo-electric cantilever beam 902 and the seismic mass 904. The piezo-electric cantilever beam 902 generates an electric potential in response to an applied mechanical stress. The applied mechanical stress is provided by the operationally vibrating equipment to which the adaptive self-powered sensor node is attached. The mechanical stress applied results in the vibration of the piezo-electric cantilever beam 902 and attached seismic mass 904 indicated by arrow 908. The vibration of the cantilever beam may be approximately described as simple harmonic motion.

The voltage potential provided by the periodic strain of the piezo-electric cantilever beam 902 as it vibrates is a sinusoidal voltage varying from positive voltage to negative voltage. The frequency of the voltage changes corresponds to the frequency of vibration of the cantilever beam and the peak amplitude of the voltage corresponds to the maximum strain or mechanical displacement of the cantilever beam. The cantilever beam is typically fabricated as a thin flat, elongated strip of piezo-electric material that when fixed at one end, the other end is free to vibrate up and down for example. The beam is compliant in the direction perpendicular to the plane of the piezo-electric flat strip and substantially stiffer in directions lying in the plane of the flat piezo-electric strip. In practice, two piezo-electric strips are often stacked together forming a bimorph. Multiple bimorphs may be packaged or stacked together.

Over time, the vibration characteristic of the equipment varies due to environmental changes such as temperature and equipment changes such as wear or load, therefore changing the frequency of the vibration stimulus that affects the vibration of the cantilever beam 902. The power output provided by the generator component 808 is at its maximum when the resonant frequency of the cantilever beam 902 and an attached seismic mass 904 match the frequency of vibration of the equipment occurring in the direction of movement of the cantilever beam. In the case of complex vibration patterns from the equipment, vibration of the cantilever beam will be a maximum when the resonant frequency of the cantilever beam matches the frequency of the vibrating equipment with the greatest amplitude in the direction of the vibrating beam with lowest compliance. Vibrations occurring in directions parallel to the plane of the piezo-electric beam do not result in any displacement or vibration of the piezo-electric beam.

The generator component 808 is maintained at peak efficiency by instructing the actuator component 810 to retract or extend the seismic mass in the linear direction indicated by arrow 906. Shifting the position of the seismic mass 904 changes the length of the beam or the tip mass of the cantilever beam. This in turn changes the natural frequency or the resonant frequency of vibration of the piezo-electric cantilever beam 902 and the attached seismic mass 904 and allows tuning of the generator 808 to optimize energy production. Changing the mass location on the cantilever beam may be done using a linear motor attached to a mass free to slide along the cantilever beam. Dynamically changing the resonant frequency of the piezo-electric beam in response to changes in the vibration characteristics of the equipment permits adaptively optimizing the operation of the generator component. The resultant power generated from re-tuning the cantilever beam provides a source of information about the condition of the equipment. For example, if the seismic mass 904 is indexed to a new location that results in the resonant frequency of the cantilever beam matching the rotational speed of a motor and significant energy is generated at this synchronous speed, this provides a source of information supporting the state assessment that there is an out of balance condition of the machinery. This information will reduce system entropy, H. Alternatively, moving the mass to a different position corresponding to a non-critical frequency will likely not result in reducing H but will nonetheless expend valuable energy.

Analyzing the energy generated at a particular cantilever beam resonant frequency provides valuable information about the equipment and provides a basis for reducing the entropy of the system. Tuning the cantilever beam can be achieved using a number of mechanisms in addition to the relocation of the seismic mass. An alternative tuning mechanism is shown in FIG. 9a where a fulcrum is indexed toward or away from the free vibrating end of the cantilever beam. The fulcrum serves as the fixed point of the cantilever beam and provides a means to effectively change the length of the vibrating section of the cantilever beam.

Alternatively, a series of fulcrums may be moved along the cantilever beam or may exist along the length of the beam at critical locations and not contacting the beam. An actuation scheme may raise selective fulcrums to contact the beam and change the effective vibrating length of the beam to achieve a specified resonant frequency. This in turn dynamically changes the resonant frequency of the cantilever beam. Other mechanisms for tuning such as altering the beam tension or dynamically coupling the beam to a movable member can also affect the beam mass or stiffness and thereby dynamically change the resonant frequency of the cantilever beam.

Alternatively, the axis of the vibrating cantilever beam may be dynamically re-oriented in three dimensions using an additional actuator as depicted in FIG. 9b. Yet another alternative is to employ two or more directional generators on a machine and integrate them in a package with different orientations so their axis of vibration is orthogonal to each other. Each of the multiple generators may be tuned independently while they utilize common elements such as the processor node in the complete integrated system.

Figure 10:
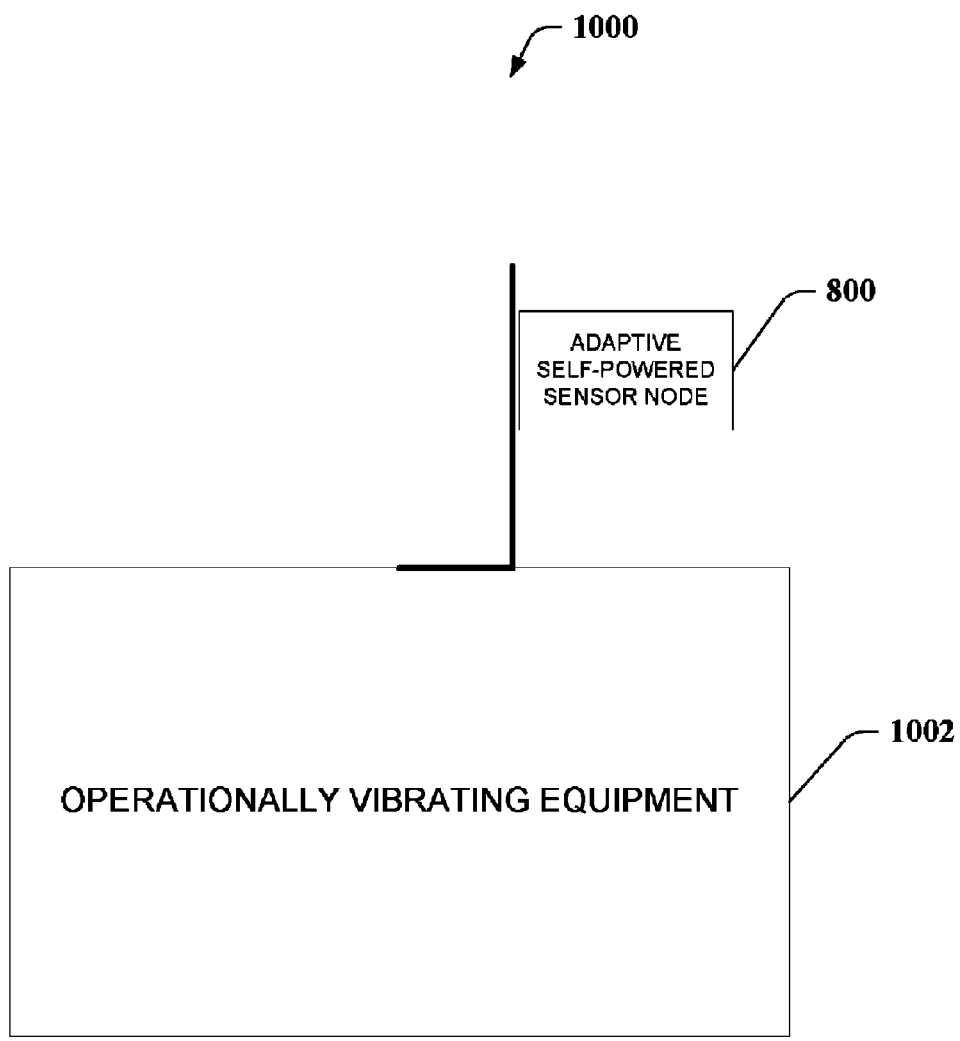
FIG. 10 depicts a block diagram of an adaptive self-powered sensor node rigidly attached to operationally vibrating equipment.

FIG. 10 of the drawings depicts an adaptive self-powered sensor node attached to operationally vibrating equipment 1002. The adaptive self-powered sensor node can be mounted to a framework such as a metal bracket of sufficient thickness to prevent stress fracture from the vibration as indicated in 1000 or it can be mounted directly to the operationally vibrating equipment 1002. Fundamental to the mounting mechanism is a rigid connection that allows for a maximum transfer of the vibration energy from the operationally vibrating equipment 1002 to the adaptive self-powered sensor node 800. Additionally, the direction of vibration of the vibrating equipment 1002 must lie substantially in the direction of maximum possible displacement of the cantilever beam. This corresponds to the direction of maximum compliance or minimum stiffness of the cantilever beam. If the direction of vibration of the equipment does not lie in the plane of the displacement of the cantilever beam, then the orientation of the cantilever beam must be mounted or re-oriented so the axis of cantilever beam displacement is aligned with the direction of vibration of the equipment. It is common for equipment to exhibit lateral vibration in all three axis and potentially rotational vibration around three axis.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers ... ). Other mechanisms such as analytic models, stochastic models, model-free estimators, and gradient search techniques may also be used to direct the dynamic adaptation of the sensor node. Similar to the previous discussion, the response from the system after making a change can provide a basis for improving the rules, neural network, or model and also serve to provide additional state information on the equipment and reduce information entropy. Such components, inter alia, and in addition to that already described herein, can automate certain mechanisms or processes performed thereby to make portions of the systems and methods more adaptive as well as efficient and intelligent.

It should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, media, or a carrier in conjunction with such computer-readable device or media.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, industrial controllers, microcontrollers and the like, each of which can be operatively coupled to one or more associated devices. The tuning logic can also be implemented in analog components.

The illustrated aspects of the claimed subject matter can also be practiced in distributed computing environments where certain tasks are performed by remote processing devices that are linked through a communications network. In a distributed computing environment, program modules can be located in both local and remote memory storage devices. For example, one of multiple distributed adaptive self-powered sensor nodes on a machine may transmit the cantilever beam resonant frequency and the power being generated to another adaptive self-powered sensor node on the same machine. This information can be used by the second sensor node to not only reduce its information entropy but may also signal the sensor node to retune its cantilever beam to the same frequency the first sensor node is using or alternatively, to not waste energy trying to retune the cantilever beam to match the first sensor node beam frequency due to the limited power available at this frequency.

Figure 10A:
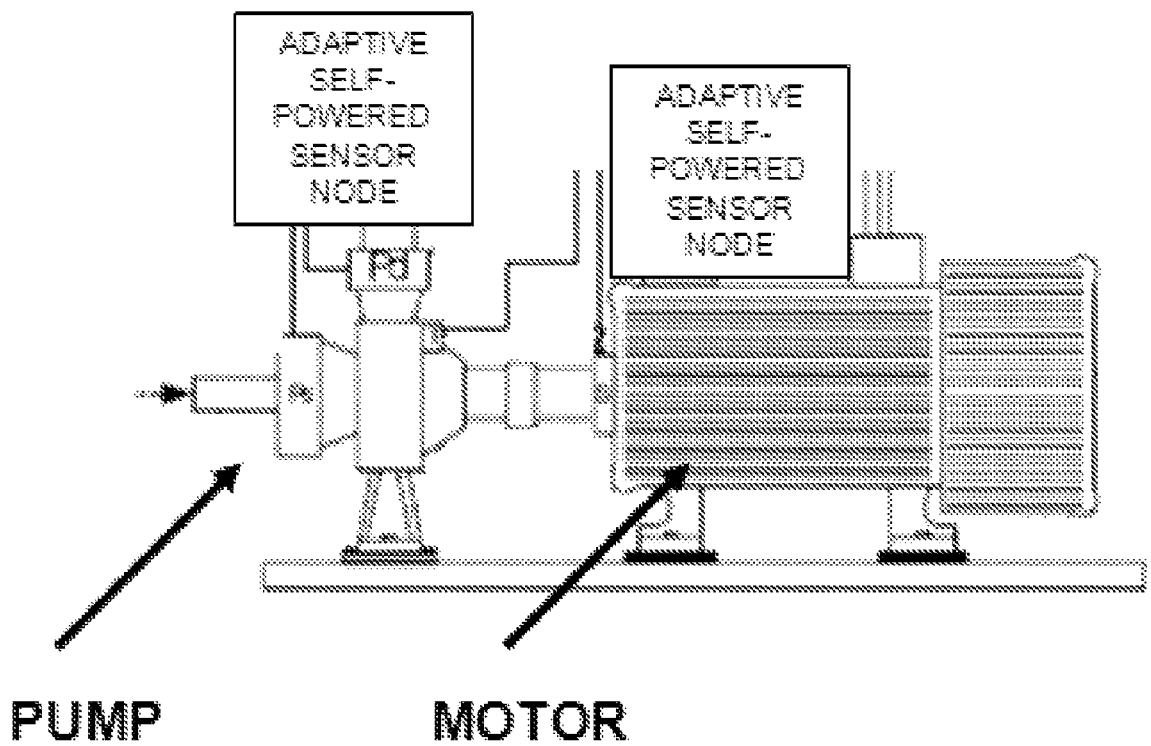
FIG. 10a depicts a block diagram of two adaptive self-powered sensor nodes rigidly attached to a pump and a motor and communicatively connected.

The communication and collaboration among multiple distributed adaptive self-powered sensor nodes may be performed using the framework of intelligent autonomous agents or distributed agents. This framework permits multiple sensor nodes to operate autonomously to achieve local goals but to coordinate and collaborate with other sensor nodes to achieve broader scope system level goals. For example, an agent with a goal to determine motor bearing condition may collaborate with another agent on a connected pump having the objective to determine if pump cavitation is occurring. The exchange of information between these two agents can permit each to achieve optimal tuning and to reduce their information entropy in a more timely and energy-efficient manner than if each was operating independently as shown in FIG. 10a.

Figure 10B:
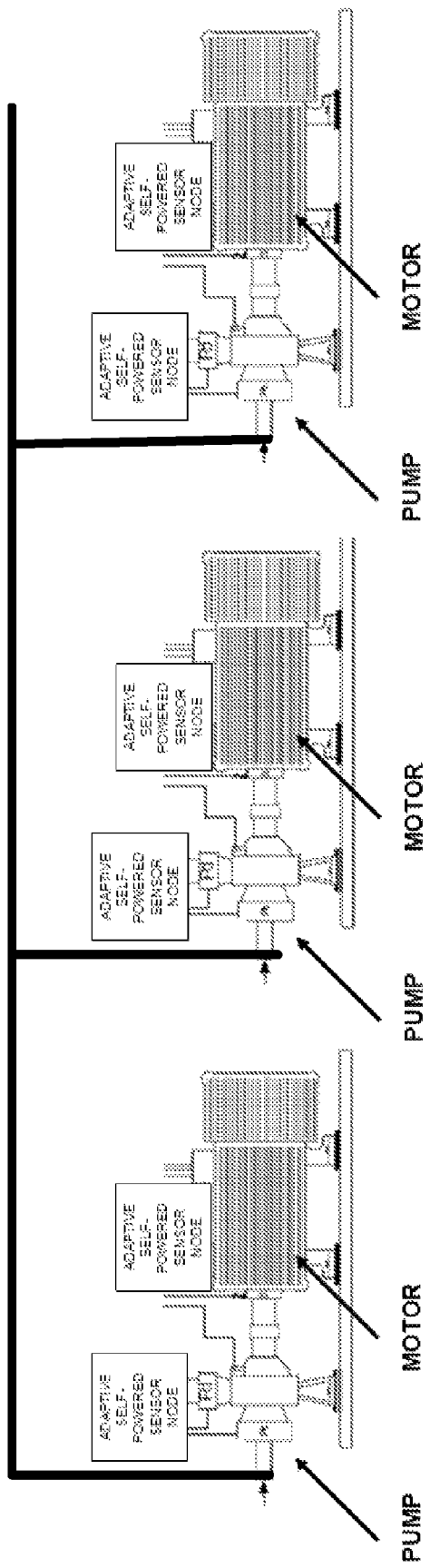
FIG. 10b depicts a block diagram of multiple adaptive self-powered sensor nodes rigidly attached multiple pumps and motors and communicatively connected.

Additionally, many distributed adaptive self-powered sensor nodes can be distributed over multiple machines as shown in FIG. 10b or a facility to dynamically exchange information and promote more efficient node operation, reduced information entropy with minimum energy expenditure, and support superior equipment and process diagnostics and prognostics and also support system level state assessment.

Figure 10C:
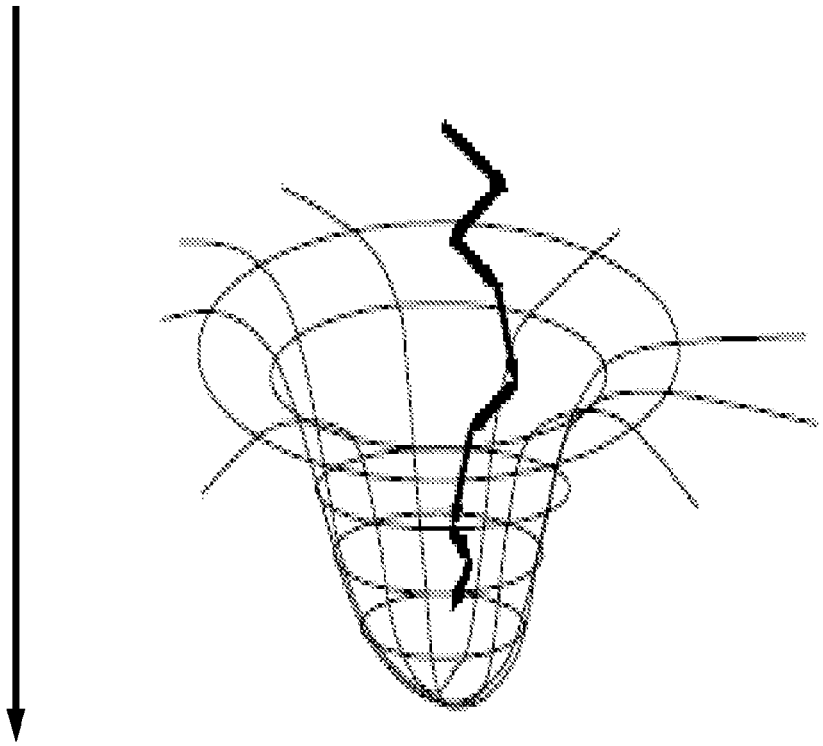
FIG. 10c depicts a diagram of a gradient descent method of optimizing energy management.

Referring now to FIG. 10c, the decision to re-tune or re-orient the generator is based on current energy needs, current energy reserves, predicted energy needs, the expected energy to be scavenged in the future at a new operating point, the energy required to achieve the new operating condition, and the likelihood or probability that future energy needs and future generation capabilities will be realized. Retuning the generator may for example involve moving the seismic mass to a new location on the cantilever beam. The direction to move the mass and the distance to move the mass can be based on an optimization decision-making criterion. The optimization criteria can employ a model of the system or can be based empirical data resulting from previous seismic mass location changes.

In another aspect of the subject innovation, a gradient search technique or method of steepest descent as is commonly used for optimization problems may be employed to establish the optimal direction and amount of travel needed for the seismic mass. An example of a map showing the sequence of moves that may be prescribed to optimize the amount of energy generated. Each incremental move of the mass provides useful information to help define the optimal move of the mass for the next control interval.

Figure 10D:
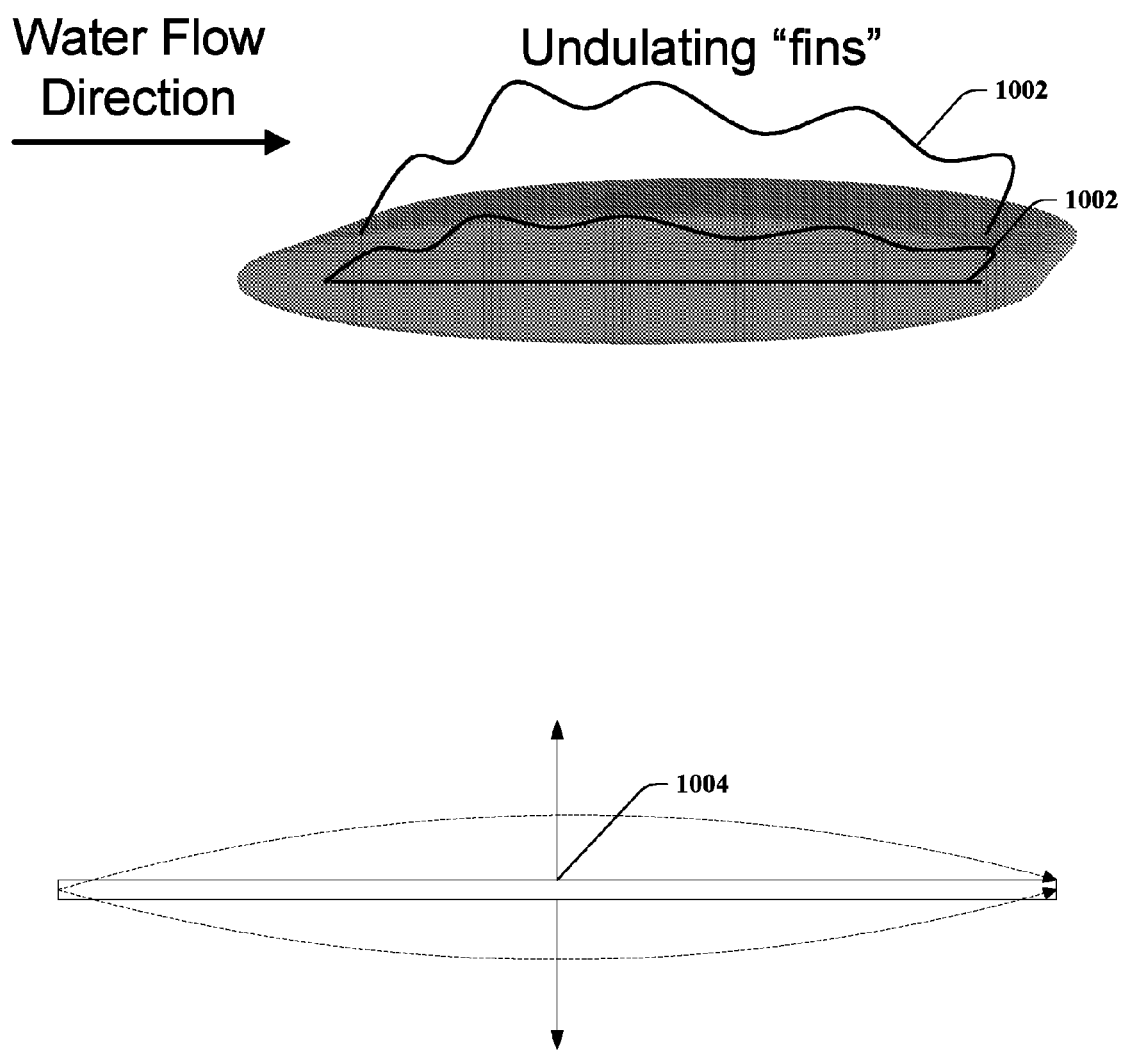
FIG. 10d depicts an example self-powered node using compliant piezo-electric material in a flow stream

In another aspect of the subject innovation, FIG. 10d represents the undulating fins 1002 of a mobile device for inspecting pipes with flowing fluid. The undulating fins 1002 are constructed of a compliant piezo-electric material and the flow of the fluid creates a cyclic strain on the undulating fins 1002 thus generating power for robot operation. In one example, the robot can be inserted in a municipal water system and travel through the pipes to inspect the structural integrity of the pipes. The undulating fins 1002 can also serve to stabilize and control the robot, similar to the action of fins on a fish. The continuous flapping of the undulating fins 1002, similar to a flag in the wind, will generate a potential that the robot can rectify, convert and store for future operations. In another aspect, the undulating fin 1002 can be operated as an actuator and used to propel the robot through the fluid.

In another aspect of the subject invention, the robot can move to areas of greater flow rate within the pipe to increase the power production. The robot can choose to move while the flow rate is at a minimum to reduce the power requirements of the move and then lie dormant while the flow rate is greater and therefore optimize the power generated by the undulating fins 1002. For example, the robot can move through a water system at night when flow rates are at a minimum and then lie dormant during the day, generating maximum power while flow rates are at a maximum.

In another aspect of the subject invention, the robot can have a piezo-electric membrane 1004 that can oscillate based on changes in hydraulic pressure. The oscillating movement of the membrane 1004 will generate potential that can be rectified, converted and stored to provide power for future robotic operations. The use of the oscillating membrane 1004 can be used in conjunction with the undulating fins 1002 to increase the efficiency of the power generation. The robot can communicate with other robots or with communications devices located at other locations throughout the piping system such as at the valves. The robots can also be outfitted with different sensing devices so they can sample the fluid for contaminants in addition to investigating the structural integrity of the piping system.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, optical and other wireless media. Suitable combinations of the any of the above should also be included within the scope of communication media derived from computer-readable media and capable of subsequently propagating through electrically conductive media, (e.g., such as a system bus, microprocessor, microcontroller, data port, and the like) and/or non-electrically conductive media (e.g., in the form of radio frequency, microwave frequency, optical frequency and similar electromagnetic frequency modulated data signals).

Figure 11:
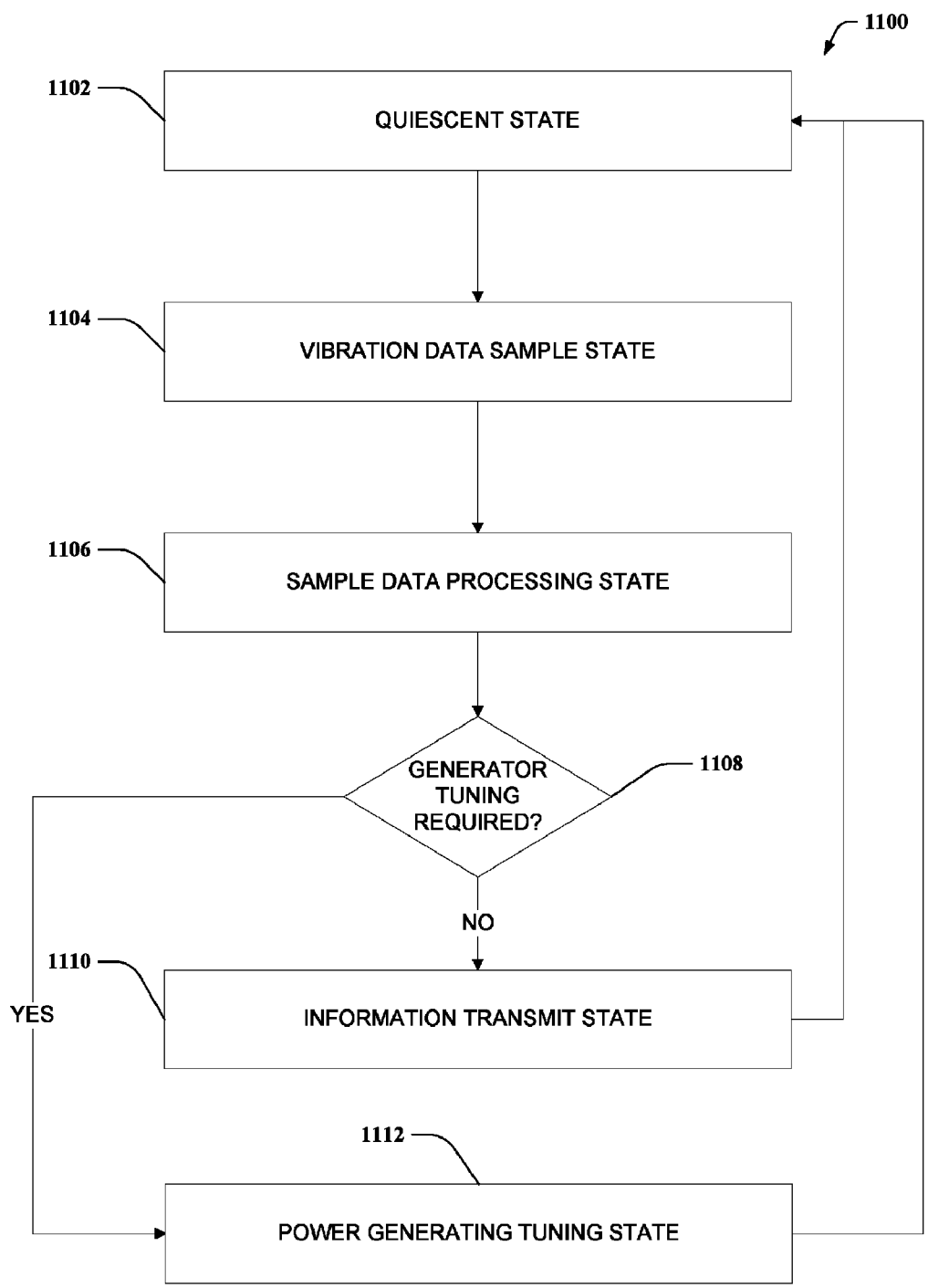
FIG. 11 depicts a flowchart of the cycle of alternating data collection, analysis, information transmittal, piezo-electric generator tuning and sleep states associated with an operating adaptive self-powered sensor node.

Returning again to the drawings, FIG. 11 depicts a predictive strategy or operational method 1100 of an adaptive self-powered sensor node 800. The primary objective of the adaptive self-powered sensor node 800 is the collection of data related to the environment of the associated equipment and the analysis of the data to determine the existence of the most probable equipment failure mode before the equipment failure occurs. It can also include assessing how soon a failure may occur or estimating the remaining useful life of the equipment. It can also be used to estimate the state of the equipment in order to change a control method that affects or uses the machinery. It can also be directed at estimating the condition of the equipment in order to coordinate planned system downtime or scheduled maintenance. Alternatively, it can be used to predict the expected state of the machine at various times in the future subject to various, potential future operating conditions. This may be useful to limit future control options or to permit selecting duty cycles or missions that will not cause an undesirable future failure of the machine.

The objectives described above must be balanced against the requirement of maintaining sufficient power, generated by generator component 808, to maintain operation of the adaptive self-powered sensor node 800 and preferably permit optimizing the desired function of the sensor node 800. For example, excess energy may be utilized to perform system condition checks more frequently than the minimum required or may enable more sophisticated signal processing and data analysis to increase the accuracy of system state estimation, further reduce information entropy, or improve the accuracy of the predicted remaining useful life.

Under some circumstances, the processor component 804 may be required to defer data analysis and reporting diagnostic functions and rather redirect available energy to retuning the generator component 808 to provide for more efficient power generation based on changing conditions in the environment. For example, the very conditions the adaptive self-powered sensor node 800 is seeking to detect and prevent, such as the seizing of anti-friction bearings, could change the frequency and amplitude of greatest vibration of the operationally vibrating equipment 1002 such that the efficiency of the generator component 808 is reduced to a level that will not sustain sufficient power to operate the adaptive self-powered sensor node 800. Under these circumstances, the processor component 804 will elect to invest available power in retracting or extending the seismic mass 904 to make the resonant vibration frequency of the piezo-electric cantilever beam 902 and the seismic mass 904 more closely match the newly detected resonant vibration frequency of the operationally vibrating equipment 1002.

Alternatively, the processor component can elect to invest available power to retune the piezo-electric cantilever beam to match the expected future vibration frequency and amplitude of the operationally vibrating equipment. In yet another alternative, such as when there is no machinery vibration amplitude or frequency data information available for tuning the piezo-electric cantilever beam, the processor component can establish an operating mode to sweep a range of positions of the seismic mass and thereby sweep a range of frequencies. The resonant frequency of the cantilever beam providing the most energy may then be selected as the most desirable beam resonant frequency and the seismic mass located at this empirically derived location.

In yet another operating mode, the seismic mass can be positioned at various locations and the generated power recorded. Subsequent positions of the seismic mass can be determined based on a progressive series of mass positions such as used in optimum search techniques. One such technique, a steepest descent search method as shown in FIG. 10c may be used to prescribe the amount of mass movement needed and the direction for moving the seismic mass to a new position on the cantilever beam.

In one aspect of an operational method 1100, quiescent state 1102 depicts a point in the operation of an adaptive self-powered sensor node 800 when the processor component 804 has shut down adaptive self-powered sensor node 800 processing to conserve available power for a period of time. During this time the adaptive self-powered sensor node 800 is unable to determine if the equipment has changed from a known operating state to an unknown state such as a failed state. Since the equipment being monitored is part of a dynamic system, information entropy will increase as a function of the duration of processor idle time. The duration of the quiescent state 1102 may change as environmental conditions change, including such changes as equipment inactivity, or heavily loaded machinery operation, critical mission operating conditions, or nearing end of useful life condition, or excessive entropy H or expected increase in entropy H. It should be noted that quiescent state 1102 is not required to be a first state, but simply one state in the cyclical operation of an adaptive self-powered sensor node 800. Additionally, the processor component 804 can determine that the quiescent state 1102 should be skipped for one or more cycles if power reserves permit and changing environmental conditions require additional processing, more timely state assessment, or more accurate state assessment, or the machinery is operating in a critical state or whose operation is a part of a critical mission.

Vibration data sample state 1104, in another aspect of the operation of an adaptive self-powered sensor node 800, depicts a point when the processor component 804 turns on the sensor component 802 for another cycle of vibration data collection. If the vibration sensor is previously powered on then this step is omitted. The processor samples the readings from the vibration sensor using an analog to digital (A/D) converter that is prevalent among microcontrollers. The digitized vibration values can be averaged, summarized, filtered, and provided to the processor component 804 for storage or analysis. The processor typically reads the sampled vibration values from the sensor component 802 and stores them in data memory locations located within the processor component 804. After the processor component 804 has collected sufficient data, the processor component 804 turns off the sensor component 802 to conserve available energy resources. Alternatively, the sensor component 802 may be left on if sufficient power reserves exist.

In another aspect of an operational method 1100, the sample data processing state 1106 analyzes the vibration data provided by sensor component 802 and determines which action adaptive self-powered sensor node 800 will take next. The goal of the sample data processing state 1106 with respect to analyzing the vibration data is to determine for a finite list of equipment operational states, the likelihood the equipment is in a particular operational state at a given instant in time. Initially, sample data processing state 1106 does not have any information concerning the operational state of the equipment therefore each equipment state is equally likely.

Sample data processing state 1106 determines knowledge about the potential operational state by computing values that relate the condition of the system along with calculating the information entropy of each state. The information entropy of a random variable may be calculated from the equation $$H \text{ (entropy)} = -\Sigma^n_{i=1} pi \log pi$$

where $p_1, p_2, \ldots p_n$ are the probabilities of n mutually exclusive events and pi is the probability of being in state i, or for our purposes, the equipment operational state.

Further, sample data processing state 1106 extends a set of time-constrained tests that maximize the reduction in information entropy over a fault set by selecting an operating strategy providing the greatest reduction in information entropy for a given expenditure of energy subject to defined constraints on time and energy. Specifically, the objective of the analysis performed by the sample data processing state 1106 is to select a strategy from the set of permissible strategies such that the selected strategy will result in the greatest reduction in information entropy per unit of energy expended to collect and analysis machinery data. The analysis can be represented by $$\text{Select } s_j \in S \text{ s.t.} (\Delta H_j/e_j) \geq (\Delta H_k/e_k)(s_k \in S, k \neq j)$$

where $\Delta H_j$ is the change in system information entropy from expending energy $e_j$ required to execute strategy $s_j$. The calculated strategy is optimal from the perspective that the strategy provides the maximum amount of information in relation to the energy expended to collect the data necessary to estimate the state of the equipment. The eventual desired outcome is that the probability of the correct equipment state reaches a value of one while all other states of the finite group of states take on a value of zero. The approach described above for a single fault system can be extended to a multiple simultaneous fault system with the utilization of conditional entropy. It should be noted that the selected strategy can change during any analysis cycle based on the amount of energy reserves available in the energy storage component 814.

Figure 11A:
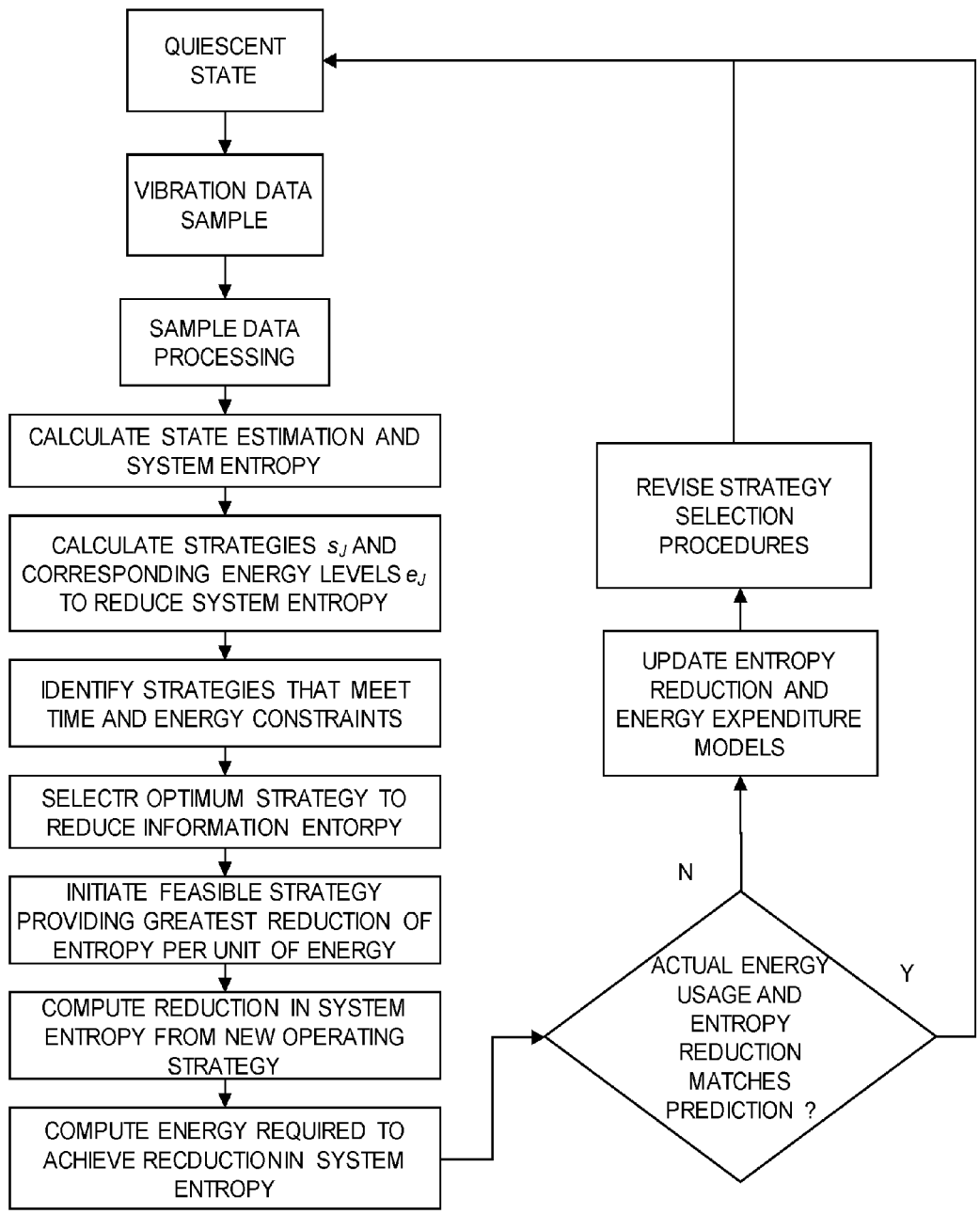
FIG. 11a depicts a flowchart of the cycle of alternating data collection, analysis, information transmittal, piezo-electric generator tuning and sleep states associated with an operating adaptive self-powered sensor node based on Entropy reduction.

The selected strategy may also change based on partial information gained while executing the established operating strategy $s_j$. For example the amplitude of vibration sampled may indicate a more likely fault state requiring further investigation and the original state investigation may be suspended. Finally, it may be desirable to place a greater emphasis on reducing the information entropy of critical systems states such as a bearing failure and placing less emphasis on less critical fault states such as slight machinery unbalance. The actual reduction in information entropy and energy expended is compared with the estimated entropy reduction and energy estimates used to originally select this strategy. Any significant discrepency between the actual and expected values for information entropy and energy consumption may result in the information-energy models being changed, new rules generated, or new strategies adopted. Subsequent operation of the adaptive sensor node will be performed with greater accuracy and will reflect the changing and dynamic nature of the machinery. The adaptation of models, strategy, and estimating entropy and energy based on actual observed values is shown in FIG. 11a.

Referring again to FIG. 11, in another aspect of an operational method 1100, a generator tuning required decision 1108 is made regarding the desired action to take after the processor component 804 analyzes the data provided by sensor component 802. As previously mentioned, the primary objective of the adaptive self-powered sensor node 800 is to provide information assessing or predicting the state of the operationally vibrating equipment. Under circumstances comprising inadequate power reserves to complete this task or an analytic conclusion that the generator component 808 is not operating at the optimal efficiency or a prediction that future energy needs will not be met without tuning the generator as soon as possible, the processor component 804 can forego the transmission of information to the server component 1420 and expend energy reserves to retune the generator component 808 so the cantilever beam resonant frequency more closely matches the frequency of the operationally vibrating equipment 1002 containing the most energy.

The information transmit state 1110, in another aspect of the operation of an adaptive self-powered sensor node 800, depicts a point where the processor has determined there is sufficient power reserves in the energy storage component 814 and the generator component 808 is operating at optimal efficiency. The processor component 804 now turns on the radio component 806 and transmits the results of the analysis to the server component 1420. Once the processor component 804 has completed the information transmission, the processor component 804 turns off the radio component 806 to conserve energy resources and returns to quiescent state 1102 and awaits the next data analysis cycle. Rather than transmitting the results of analysis to a server component 1420, the information could be transmitted to one or more other sensor nodes 800.

In another aspect of the operation of an adaptive self-powered sensor node 800, power generating tuning state 1112 depicts a point where the processor component 804 determines that it is prudent to adjust the resonant frequency of the piezo-electric cantilever beam 902 of generator component 808 to more closely match the frequency of the operationally vibrating equipment 1002 containing the most energy. After the processor component 804 retunes the generator component 808, the processor component 804 returns to quiescent state 1102 and awaits the next data analysis cycle. Alternatively, the processor may determine it is necessary to retune the generator component 808. The processor may elect to transmit state information and the plan to retune the generator and then proceed to return the power generator followed by transmitting again the condition of the generator and the generated power and stored power and the state estimation of the vibrating machinery.

Figure 12:
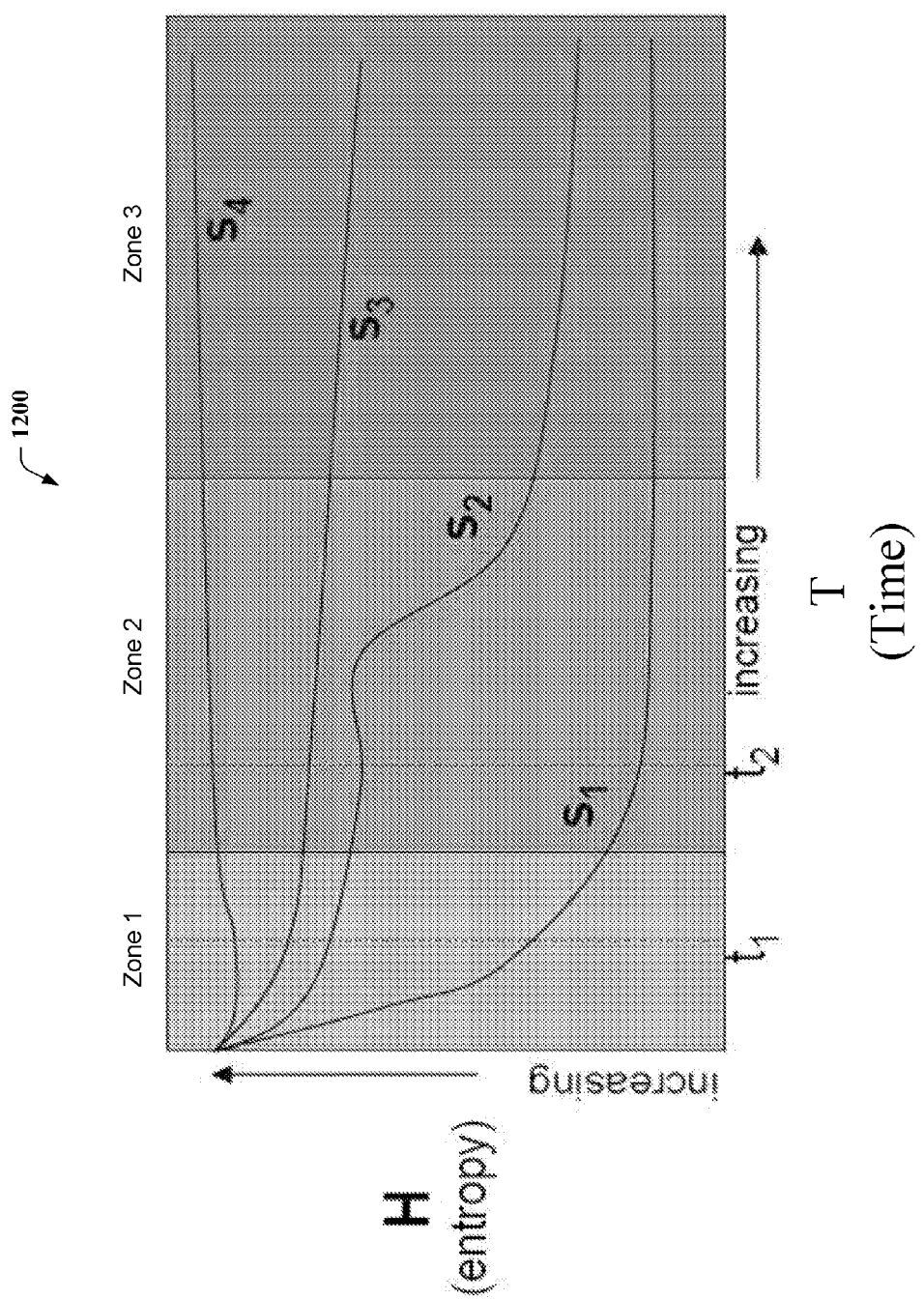
FIG. 12 depicts an illustrative graph of different operational strategies available to the self-powered sensor node as a function of Entropy versus time.

Referring to the drawings, FIG. 12 is an exemplary chart representing the predicted expenditure of energy to reduce entropy under four different operating strategies. The chart is divided into three zones with zone 1 depicting sufficient energy available, zone 2 depicting marginal energy available and zone 3 depicting critically insufficient energy available. Illustrated is the fact that as available energy reserves are depleted an initially selected optimal strategy may cease to be the optimal strategy in terms of the reduction of information entropy for energy expenditure. Accordingly, the adaptive self-powered sensor node can select a new strategy as energy resources change. In the extreme condition, it can become necessary to terminate operation in order to establish the state of a critical component with sufficient certainty to allow safe shutdown of the monitored equipment 102. The strategy selection and adaptive self-powered sensor node 800 operation also predicts the resultant change in entropy, the amount of energy expected to carry out the new strategy and to achieve the new entropy reduction, and the amount of time required to complete the strategy. Additional information such as the cumulative amount of new energy expected to be generated while carrying out the strategy may be considered in addition to the expected probability that new, unforeseen events of a higher priority requiring energy may arise and cause an interruption in completing the chosen strategy.

Figure 13:
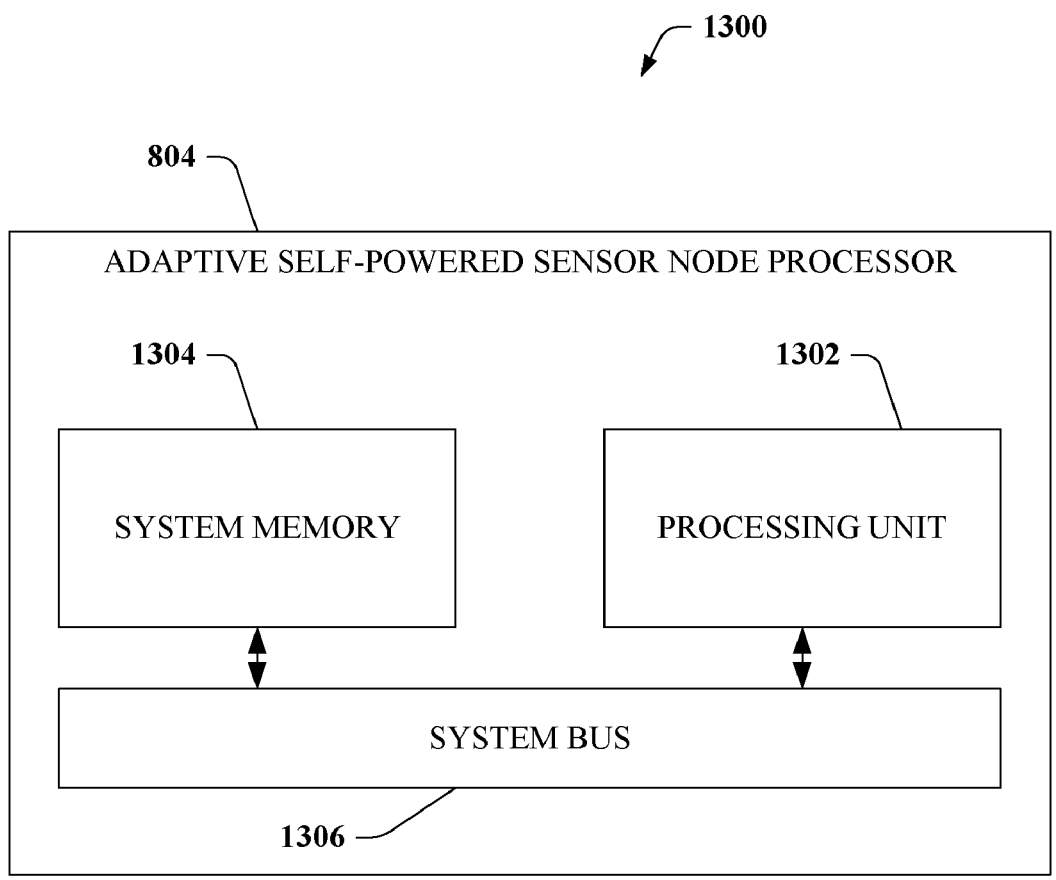
FIG. 13 depicts an adaptive self-powered sensor node processor.

Referring now to FIG. 13, there is illustrated a block diagram of an adaptive self-powered sensor node 1300 operable to provide networking and communication capabilities between a wired or wireless communication network and a server and/or communication device. In order to provide additional context for various aspects of the claimed subject matter, FIG. 13 and the following discussion are intended to provide a brief, general description of a suitable computing environment 1300 in which the various aspects described herein can be implemented. While the description above is in the general context of computer-executable instructions that can run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, microcontrollers, programmable logic computers (i.e. PLC's), minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter can also be practiced in distributed computing environments where certain tasks are performed by remote processing devices that are linked through a communications network. The communications network may be short distance, localized communications such as one employing Bluetooth or Zigbee or utilizing a low power wireless network such as IEEE 802.15.4. Alternatively, the network may consist of wired or wireless Ethernet, optical networks (e.g. fiber optic networks), modbus, profibus, or other network protocols. Alternatively or in addition to the above, the network may include satellite or remotely distributed nodes such as may be connected to the internet. In a distributed computing environment, program modules can be located in both local and remote memory storage devices and in fixed and or mobile or moveable equipment.

An adaptive self-powered sensor node 1300 typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media can include volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media or optical waveguide or freespace optical connections. Suitable combinations of the any of the above should also be included within the scope of communication media derived from computer-readable media and capable of subsequently propagating through electrically conductive media, (e.g., such as a system bus, microprocessor, data port, and the like) and/or non-electrically conductive media (e.g., in the form of radio frequency, microwave frequency, optical frequency and similar electromagnetic frequency modulated data signals).

With reference again to FIG. 13, the exemplary environment 1300 for implementing various aspects includes a processor component 804, the processor 804 including a processing unit 1302, a system memory 1304 and a system bus 1306. The system bus 1306 can couple system components including, but not limited to, the system memory 1304 to the processing unit 1302. The processing unit 1302 can be any of various commercially available processors, such a single core processor, a multi-core processor, a microcontroller, a digital signal processor (i.e. DSP), or any other suitable arrangement of processors. The system bus 1306 can be any of several types of bus structure that can further interconnect to a memory bus (with or without a memory controller), analog and digital I/O, communications modules, counter modules, display modules, a peripheral bus, and a local bus using any of a variety of commercially available bus architectures. The system memory 1304 can include read-only memory (ROM), random access memory (RAM), high-speed RAM (such as static RAM), EPROM, EEPROM, and/or the like.

Additionally or alternatively, the processor 804 can be operably connected to a hard disk drive, upon which program instructions, data, and the like can be retained. Moreover, removable data storage can be associated with the processor 804. Hard disk drives, removable media, etc. can be communicatively coupled to the processing unit 1302 by way of the system bus 1306. There may exist one or more of each element of sensor node system 800 including multiple sensor components 802, processor components 804, radio components 806, generator components 808, actuator components 810, power conversion electronics components 812, and energy storage components 814. Each may employ different or redundant functions, designs, materials, or purposes to improve the reliability, lifetime, flexibility, effectiveness, or efficiency of the integrated sensor node 800.

The system memory 1304 can retain program modules, such as an operating system, one or more application programs, other program modules, and program data, sampled data tables, strategies, historical information, configuration information. All or portions of an operating system, applications, modules, and/or data can be, for instance, cached in RAM, retained upon a hard disk drive, or any other suitable location. The memory can consist of fixed, non-changeable data and instructions such as boot instructions or program code, and may also consist of changeable data and instructions that are altered dynamically by the processing unit 1302 for storing, trending, analyzing, and altering data and for changing rules, strategies, and instructions to support adaptively tuning and optimizing sensor node operation.

In another aspect, a user can enter commands and information into the processor 804 through one or more wired/wireless input devices, such as a keyboard, pointing and clicking mechanism, pressure sensitive screen, microphone, joystick, stylus pen, etc. connected directly to the processing unit 1302 and/or coupled to the processing unit through the system bus 1306. Alternatively, commands into the processor 804 may be initiated from another sensor node and transmitted to the processor for evaluation and operation. Exchanging commands and information among sensor nodes can be performed to support sensor node operation in the framework of intelligent agents or autonomous agents.

A monitor or other type of interface can be connected to a communications module that interfaces to the system bus 1306. The processing unit can have an internal bus and system memory that is integral to the processor core and the components may be fabricated on a single die or integrated circuit. Additional services and peripheral capabilities can also be integrated into the single processor integrated circuit including analog to digital (A/D), digital to analog (D/A), multiple processors, a digital signal processor element (DSP), and communications interface such as RS232 or PCI interface.

The processor 804 can operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, or other adaptive self-powered sensor nodes, etc. The processor 804 can connect to other devices/networks by way of antenna, port, network interface adaptor, wireless access point, modem, fiber optic, free space optical link, microware, and/or the like.

The processor 804 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out, anywhere within the range of a base station. WiFi networks use radio technologies called IEEE 802.11 (a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Alternatively, a cellular data link may be used to connect the sensor node to a wired network such as provided by the major telecommunications companies. Wireless sensor nodes may be located on stationary equipment, civil structures, or machines. They may also be located on mobile entities such as vehicles, aircraft, ships, humans, animals, robots, or automated guided vehicles (AGV's) for example.

Figure 14:
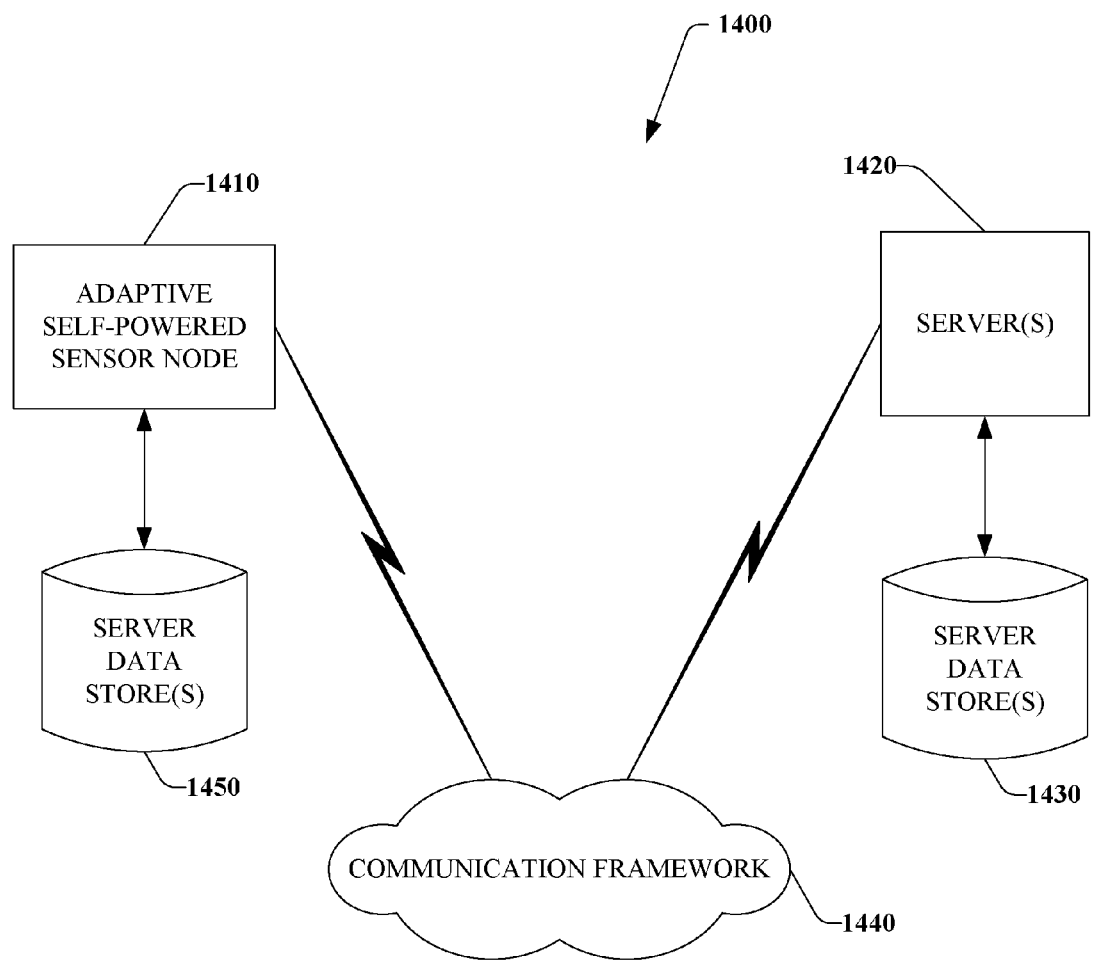
FIG. 14 depicts a representative communication network between an adaptive self-powered sensor node and a data collection server.

FIG. 14 is a schematic block diagram of a sample-computing environment 1400 within which the disclosed and described components and methods can be used. The system 1400 includes one or more client(s) 1410. The client(s) 1410 can be hardware and/or software (for example, threads, processes, computing devices). The system 1400 also includes one or more server(s) 1420. The server(s) 1420 can be hardware and/or software (for example, threads, processes, computing devices). The server(s) 1420 can house threads or processes to perform transformations by employing the disclosed and described components or methods, for example. Specifically, one component that can be implemented on the server 1420 is a security server.

The server may be a powered device that incorporates more complex and compute and energy intensive analysis of the data from one or more sensor nodes 1410. The server may perform computation that includes trending, modeling, strategy selection, state estimation, archiving, and distribution of new code, data, and strategies to be downloaded to one or more remote adaptive self-powered sensors nodes. Both the sensor nodes 1410 and the servers 1420 may support wired or wireless communications and may be self-powered or externally powered. Additionally, various other disclosed and discussed components can be implemented on the server 1420.

One possible means of communication between a client 1410 and a server 1420 can be in the form of a data packet adapted to be transmitted between two or more computer processes. The system 1400 includes a communication framework 1440 that can be employed to facilitate communications between the client(s) 1410 and the server(s) 1420. The client(s) 1410 are operably connected to one or more client data store(s) 1450 that can be employed to store information local to the client(s) 1410. Similarly, the server(s) 1420 are operably connected to one or more server data store(s) 1430 that can be employed to store information local to the server(s) 1420.

The adaptive self-powered sensor nodes can operate as a network or in a peer to peer configuration. Data and information can be exchanged among the sensor nodes to permit each to perform their intended operation or to collectively reduce the information entropy across the collection of sensor nodes. Reducing the information across the suite of sensor nodes can be accomplished at the expense of not reducing or perhaps even increasing the information entropy of one or more individual participant nodes.

Figure 15:
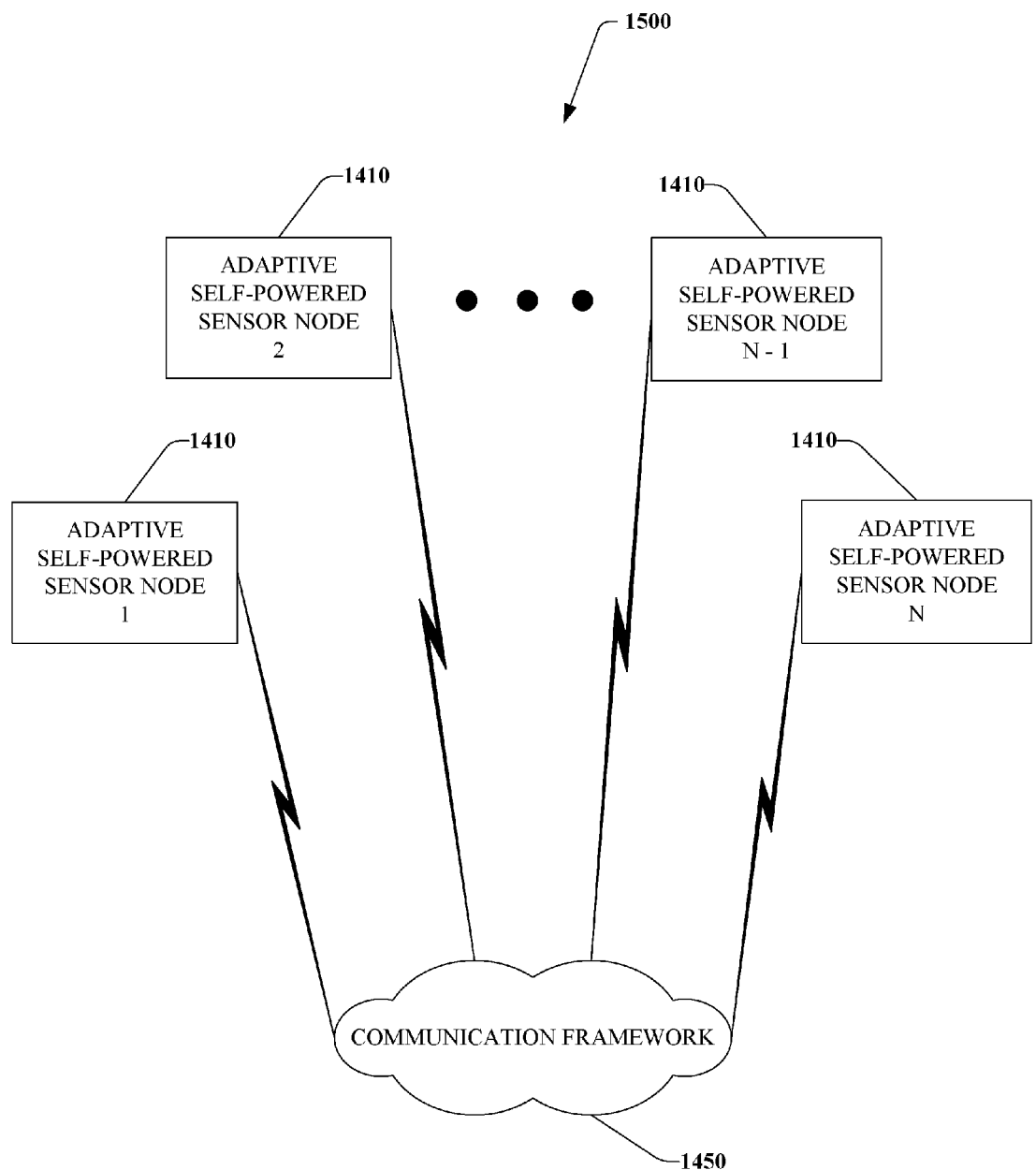
FIG. 15 depicts a block diagram of multiple self-powered sensing systems communicatively sharing information.

Referring again to the drawings, FIG. 15 illustrates an embodiment of the subject invention where a plurality of self-powered sensing systems can operate collaboratively based on their proximity or based on their operating objective or other common attributes. For instance, as described previously, the self-powered sensing system can be attached to the same equipment 102 and serve as redundant backups of each other. In another example, again as previously described, the self-powered sensor nodes can operate in turn, communicating control information as a token to coordinate operation as the one holding the token works while the others sleep and build up power reserves.

In yet another embodiment, the self-powered sensing systems can operate in a series fashion, for example adaptive self-powered sensor node 1 can transmit its information to adaptive self-powered sensor node 2 which proceeds to transfer the cumulative information to adaptive self-powered sensor node N-1 and in a similar fashion transmits the further accumulated information to adaptive self-powered sensor node N where the total information is transmitted to a server 1420.

The self-powered sensor nodes that comprise the system 1500 may operated as prescribed for autonomous agents. A protocol may be employed such as an open industry standard such as FIPA (Foundation for Intelligent Physical Agents) or a specialized inter-agent communications protocol may be selected. The assessment of the state of the system and reduction in information entropy may be carried collectively and collaboratively by the cooperating suite of sensor nodes.

What is claimed is:

1. An adaptive self-powered sensor node system, comprising:
   a sensing component associated with a sensor node and configured to collect information relating to a state of a device; and
   an entropy calculation component configured to operate the sensor node according to an entropy reduction strategy formulated based on a calculated entropy of the information and a measured resource constraint of the sensor node, wherein the measured resource constraint comprises at least an amount of available power for the sensor node.

2. The system of claim 1, further comprising a generator component configured to transform vibration energy received by the sensing component into electrical energy and to employ the electrical energy to power the sensor node.

3. The system of claim 2, wherein the sensing component comprises a piezo-electric component configured to power the sensing component.

4. The system of claim 3, further comprising a tuning component configured to selectively tune the sensor node as a function of a utility-based analysis that factors a cost of tuning with one or more benefits of tuning.

5. The system of claim 4, wherein the tuning component is configured to adjust a seismic mass component associated with the piezo-electric component to substantially match a resonant frequency of vibration of the piezo-electric component with a selected vibration frequency of the device.

6. The system of claim 1, wherein the information comprises vibration information associated with the device.

7. The system of claim 1, wherein the sensing component further comprises a wireless transceiver configured to exchange data with a server.

8. The system of claim 1, wherein the entropy calculation component is configured to select a duration of a quiescent state for the sensor node based at least in part on the calculated entropy of the information and the amount of available power for the sensor node.

9. The system of claim 1, wherein the measured resource constraint further comprises an available processing time for the sensor node.

10. The system of claim 1, wherein the entropy calculation component is configured to select the entropy reduction strategy from a set of permissible entropy reduction strategies based on a calculation that estimates, for at least one of the strategies in the set of permissible entropy reduction strategies, an expected change in information entropy and an expected energy expenditure.

11. An adaptive self-powered sensor node system, comprising:
    means for collecting state information for a device;
    means for selecting a strategy for at least one of collecting or processing the state information based at least in part on a calculated entropy of the state information and a measured resource constraint of the sensor node, wherein the measured resource constraint is at least an amount of available power for the sensor node; and
    means for operating the sensor node according to the strategy.

12. The system of claim 11, further comprising:
    means for selectively tuning the sensor node as a function of a utility-based analysis that factors a cost of tuning with one or more benefits of tuning.

13. The system of claim 12, further comprising:
    means for tuning a resonant vibration frequency of a piezo-electric cantilever beam to substantially match a resonant frequency of the device.

14. The system of claim 11, further comprising means for setting a duration of time in which the sensor node remains in a quiescent state as a function of the level of information entropy and the amount of available power for the sensor node.

15. A method for optimizing accuracy of information from a monitored system, comprising:
    collecting information relating to a state of a monitored device using a sensor node;
    calculating a level of information entropy associated with the information;
    measuring a resource constraint for the sensor node including measuring at least an amount of available power for the sensor node; and
    in response to determining that the level of information entropy exceeds a predetermined level:
        selecting an entropy reduction strategy for operating the sensor node based at least in part on the level of information entropy and the resource constraint; and
        operating the sensor node in accordance with the entropy reduction strategy.

16. The method of claim 15, wherein the collecting information comprises collecting vibration information for the monitored device.

17. The method of claim 15, wherein the selecting the entropy reduction strategy comprises setting a time duration for a quiescent state of the sensor node as a function of the level of information entropy and the amount of available power for the sensor node.

18. The method of claim 15, wherein the selecting the entropy reduction strategy comprises determining an amount of processing to be performed on previously collected data as a function of the level of information entropy and the resource constraint of the sensor node.

19. The method of claim 15, wherein the selecting the entropy reduction strategy comprises electing to perform tuning on a resonant frequency of a piezo-electric element associated with the sensor node and to monitor results of the tuning.

20. The method of claim 15, wherein the selecting the entropy reduction strategy comprises electing to exchange and compare state information with a different sensor node given the level of information entropy and the resource constraint.

21. The method of claim 15, wherein the operating the sensor node comprises operating the sensor node in accordance with the entropy reduction strategy until determining that the level of information entropy is below the predetermined level or until determining that the level of information entropy cannot be further reduced.

22. The method of claim 15, wherein the selecting the entropy reduction strategy comprises predicting an amount of reduction in the level of information entropy afforded by a given strategy and an amount of expended sensor node power required for the given strategy.

23. The method of claim 19, wherein the tuning comprises tuning a resonant frequency of a piezo-electric element associated with the sensor node as a function of a utility-based analysis that factors a cost of the tuning with one or more expected benefits of the tuning.

* * * * *